US009992780B2

(12) United States Patent
Gauvreau et al.

(10) Patent No.: US 9,992,780 B2
(45) Date of Patent: Jun. 5, 2018

(54) METHODS AND APPARATUS FOR ACCESSING SPECTRUM IN A SHARED SPECTRUM SYSTEM

(71) Applicant: InterDigital Patent Holdings, Inc., Wilmington, DE (US)

(72) Inventors: Jean-Louis Gauvreau, La Prairie (CA); Rocco Di Girolamo, Laval (CA); Athmane Touag, Chomedey Laval (CA); Martino Freda, Laval (CA); Mihaela C. Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days. days.

(21) Appl. No.: 14/031,565

(22) Filed: Sep. 19, 2013

(65) Prior Publication Data
US 2014/0080535 A1    Mar. 20, 2014

Related U.S. Application Data

(60) Provisional application No. 61/703,048, filed on Sep. 19, 2012, provisional application No. 61/816,486, filed on Apr. 26, 2013.

(51) Int. Cl.
H04W 72/08 (2009.01)
H04W 16/14 (2009.01)
H04W 72/04 (2009.01)

(52) U.S. Cl.
CPC ......... H04W 72/087 (2013.01); H04W 16/14 (2013.01); H04W 72/0453 (2013.01)

(58) Field of Classification Search
CPC .......... H04W 16/14; H04W 72/0453; H04W 72/087

(Continued)

(56) References Cited

U.S. PATENT DOCUMENTS

5,608,727 A * 3/1997 Perreault et al. ......... 455/454 X
8,041,380 B2 * 10/2011 Hamdi et al. ............. 455/522

(Continued)

FOREIGN PATENT DOCUMENTS

| CN | 101635928 A | 1/2010 |
| CN | 102223640 A | 10/2011 |

(Continued)

OTHER PUBLICATIONS

Federal Communications Commission, "Amendment of the Commission's Rules with regard to Commercial Operations in the 3550-3650 MHz Band", FCC 12-148, GN Docket No. 12-354, Dec. 12, 2012, 65 pages.

(Continued)

*Primary Examiner* — Philip Sobutka
(74) *Attorney, Agent, or Firm* — Condo Roccia Koptiw LLP

(57) ABSTRACT

Methods and apparatus for shared access systems may be used to allow operation in three-tiered shared spectrum architecture. For example, a Shared Spectrum Manager (SSM) may organize spectrum segments. The SSM may communicate with access users of different priority and may use message exchanges to request spectrum, bid for spectrum, manage spectrum, or the like. The SSM may manage admission of access users (allocation of spectrum to users) and operation with a spectrum request that may be provided as a range between a minimum (guaranteed) and maximum quality of operation. The SSM may also manage the way an access user may use the assigned spectrum. Inter-SSM communication may be used in regions where multiple SSMs may exist (e.g. country borders). Accordingly, triggers for this inter-SSM communications and corresponding actions are also disclosed herein.

18 Claims, 11 Drawing Sheets

(58) Field of Classification Search
USPC .................. 455/513, 509, 452.1, 452.2, 454
See application file for complete search history.

(56) References Cited

U.S. PATENT DOCUMENTS

| | | |
|---|---|---|
| 8,170,048 B1 | 5/2012 | Gossett et al. |
| 2004/0077366 A1 | 4/2004 | Panasik et al. |
| 2006/0083205 A1* | 4/2006 | Buddhikot et al. ........... 370/338 |
| 2010/0105400 A1 | 4/2010 | Palmer |
| 2011/0158184 A1* | 6/2011 | Agulnik ................ H04W 28/18 |
| | | 370/329 |
| 2012/0165059 A1* | 6/2012 | Schmidt et al. .............. 455/513 |

FOREIGN PATENT DOCUMENTS

| | | |
|---|---|---|
| WO | WO 2012/051157 A1 | 4/2012 |
| WO | WO 2012/051303 A1 | 4/2012 |
| WO | WO 2013/126843 A2 | 8/2013 |

OTHER PUBLICATIONS

PCAST, "Realizing the Full Potential of Government Held Spectrum to Spur Economic Growth", May 25, 2012, 12 pages.

PCAST: Report to the President: "Realizing the full potential of government-held spectrum to spur economic growth", President's Council of Advisors on Science and Technology, Jul. 2012, 192 pages.

Chen et al., "Protocol to Access Spectrum Database, draft-ietf-paws-protocol-03", PAWS: Internet-Draft, Feb. 13, 203, 79 pages.

* cited by examiner

METHODS AND APPARATUS FOR ACCESSING SPECTRUM IN A SHARED SPECTRUM SYSTEM

CROSS REFERENCE TO RELATED APPLICATIONS

This application claims the benefit of U.S. Provisional Patent Application 61/703,048, entitled "Methods and Apparatus for Shared Access System," which was filed on Sep. 19, 2012; and U.S. Provisional Patent Application 61/816, 486, entitled "Methods and Apparatus for Shared Access System," which was filed on Apr. 26, 2013; the entire disclosure of each of the two applications are hereby incorporated by reference herein.

BACKGROUND

Currently, a two-tiered shared spectrum architecture is used to share underutilized spectrum. However, operations performed over two-tiered shared spectrums consider only the two-tiered shared spectrum architecture and do not consider larger tier systems or architectures, such as three-tiered systems. Additionally, current procedures for sharing spectrum may not provide mechanisms for determining a quality of operation of a shared spectrum.

SUMMARY

Disclosed herein are methods and apparatus for shared access systems, such as methods and apparatus that may allow for devices to operate in a three-tiered shared spectrum architecture. A shared spectrum manager (SSM) may organize spectrum segments. The SSM may communicate with access users (AU) that may have different priorities and may use message exchanges to request spectrum, bid for spectrum, manage spectrum, or the like. The SSM may manage admission of access users (e.g. allocation of spectrum to users) and operation within a spectrum. For example, the SSM may handle requests provided as a range between a minimum (that may be guaranteed) and maximum quality of access (QoA). The SSM may also manage the way an access user may use the assigned spectrum. Inter-SSM communication may be used in regions where multiple SSMs may exist (e.g. country borders). Triggers for this inter-SSM communications and corresponding actions are disclosed herein.

A method and an apparatus may be provided to request spectrum in a tier of shared spectrum that may provide a quality of access (QoA). The apparatus may include a processor that may be configured to perform a number of actions. A request may be sent for a spectrum in a tier of shared spectrum that may provide a QoA for an access user, such as the apparatus. A list of available spectrum in the shared spectrum that may conform to the QoA and may be allocated for use by the access user may be received. The spectrum may be determined from the list of available spectrum. A spectrum use message may be sent to request that the spectrum be allocated for use by the access user.

A method and an apparatus may be provided to manage requests for spectrum from a tier of shared spectrum. The apparatus may include a processor that may be configured to perform a number of actions. A spectrum request message may be received that may include a tier of a shared spectrum and a QoA for an access user. The access user may be a WTRU, an access point, a base station, or the like. Available spectrum in the tier of the shared spectrum may be determined. The available spectrum may conform to the QoA for the access user and may be able to be allocated to the access user. The spectrum may be allocated for a user by the access user from the available spectrum.

A method and an apparatus may be provided reallocate spectrum. The apparatus may include a processor that may be configured to perform a number of actions. A QoA event message may be received from an access user that may indicate QoA may have degraded for a spectrum segment. The access user may be a WTRU. A reallocation request may be received. The reallocation request may request that the spectrum segment may be replaced by a replacement segment from a tier of a shared spectrum. Available spectrum that may conform to the QoA and may be allocated to the access user may be determined A replacement segment from the available spectrum may be assigned to the access user.

A method and an apparatus may be provided to request that spectrum be reallocated. The apparatus may include a processor that may be configured to perform a number of actions. It may be determined that a spectrum segment may no longer conform to a QoA. A QoA event message may be sent to a shared spectrum manager (SSM). The QoA event message may indicate that the QoA may have degraded for the spectrum segment. A reallocation request may be sent to request that the spectrum segment be replaced with a replacement segment in a tier of a shared spectrum.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION OF ILLUSTRATIVE EMBODIMENTS

Figure 1A:
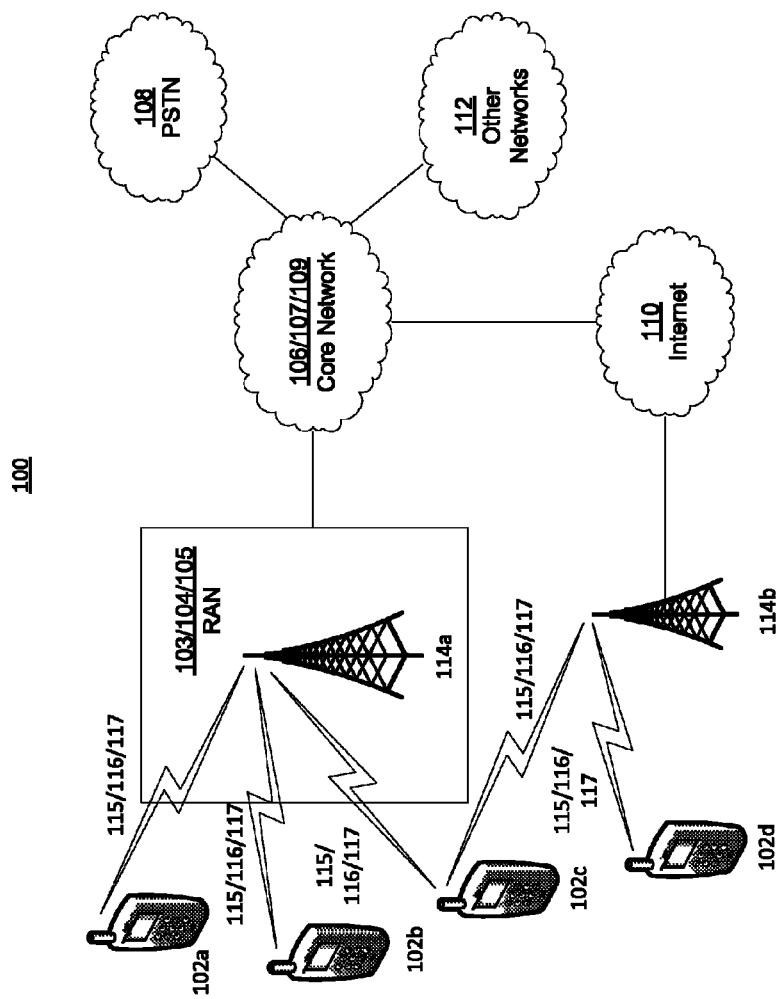
FIG. 1A depicts a system diagram of an example communications system in which one or more disclosed embodiments may be implemented.

Disclosed herein are methods and apparatus for shared access systems, such as methods and apparatus that may allow for devices to operate in a three-tiered shared spectrum architecture, or a plurality of tiered shared spectrum. A shared spectrum manager (SSM) may organize spectrum segments. The SSM may communicate with access users (AU) that may have different priorities and may use message exchanges to request spectrum, bid for spectrum, manage spectrum, or the like. The SSM may manage admission of access users (e.g. allocation of spectrum to users) and operation within a spectrum. For example, the SSM may handle requests provided as a range between a minimum (that may be guaranteed) and maximum quality of operation. The SSM may also manage the way an access user may use the assigned spectrum. Inter-SSM communication may be used in regions where multiple SSMs may exist (e.g. country borders). Triggers for this inter-SSM communications and corresponding actions are disclosed herein.

Mechanisms for operations in three-tiered shared spectrum architecture are disclosed herein. For example, a mechanism may be used for the reassignment of spectrum segments, which may occur periodically and/or aperiodically. As another example, a mechanism may be used to reserve a portion of the spectrum to general authorized access users (GAAUs), which may be tier 3 users, and may use this reserved portion of the spectrum for spectrum reassignment. As another example, a mechanism may be used to price the shared spectrum. As another example, a mechanism may be used to handle the arrival of higher priority access users to a spectrum segment and associated actions.

Mechanisms that allow operation in three-tiered shared spectrum architecture are disclosed herein. For example, a mechanism may be used for the reassignment of spectrum segments, which may be periodically and/or aperiodically. As another example, a mechanism may be used to reserve a portion of the spectrum to general authorized access users (GAAUs) and may use this reserved portion of the spectrum for spectrum reassignment. As another example, a mechanism may be used to price the shared spectrum. As another example, a mechanism may be used to deal with arrival of higher priority access users to a spectrum segment and the actions associated with this arrival.

A method may be provided for managing a segment of a shared spectrum. A first segment, a second segment, and a third segment may be determined. The first segment may be capable of being used by a primary access user (PAU), a secondary access user (SAU), and a GAAU. The second segment may be capable of being used by the SAU and the GAAU. The third segment may be capable of being used by the GAAU. It may be determined that a primary access user may request usage of the first segment. It may be determined that a secondary access user (SAU) may be using the first segment. The SAU may be moved to the second segment.

A method may be provided for reorganizing channel allocation. It may be determined that a bandwidth may be congested. A first user using the bandwidth may be requested to lower a first maximum quality of operation (QoO) while maintaining a QoO for the first user above a QoA or a QoO, that may be guaranteed. A second user using the bandwidth may be requested to increase a second maximum QoO level when the bandwidth may be less congested.

A method for spectrum reallocation may be provided. Degradation in QoO for a spectrum segment may be detected. The spectrum segment may be an active spectrum segment that may be used by a wireless transmit/receive unit (WTRU). It may be determined that a QoO for a spectrum segment may be below a QoA for the spectrum segment. A QoA event message may be sent to a shared spectrum manager (SSM) to indicate that QoA or QoO may have degraded for the spectrum segment. For example, the QoA event message may indicate that the QoO for the spectrum segment may be below the QoA for the spectrum segment. The QoA event message may include information regarding a condition detected that may be causing the degradation in QoO or QoA for the spectrum segment. A reallocation request may be sent to the SSM to request that the SSM replace the spectrum segment.

A method for spectrum reallocation may be provided. A QoA event message indicating that QoA may have degraded for an active spectrum segment may be received from an access user (AU). The access user may be a WTRU, an access point, or a base station. A reallocation request to replace the active spectrum segment may be received. A replacement spectrum segment may be assign to the AU to match a requested QoA. A method and an apparatus may be provided to request spectrum in a tier of shared spectrum that may provide a QoA. The apparatus may include a processor that may be configured to perform a number of actions. A request may be sent for a spectrum in a tier of shared spectrum that may provide a QoA for an access user, such as the apparatus. A list of available spectrum in the shared spectrum that may conform to the QoA and may be allocated for use by the access user may be received. The spectrum may be determined from the list of available spectrum. A spectrum use message may be sent to request that the spectrum be allocated for use by the access user.

A method and an apparatus may be provided to request spectrum in a tier of shared spectrum that may provide a quality of access (QoA). The QoA may be associated with exclusive use of the spectrum by the access user for an area, a time, a percentage of time, a scrambling code, or the like. The QoA may be associated with a noise level of the spectrum that may be below an acceptable level for the access user. The access user may be a WTRU, an access point, or a base station. The request for the spectrum may include a frequency band that the spectrum may be within. The apparatus may include a processor that may be configured to perform a number of actions. A request may be sent for a spectrum in a tier of shared spectrum that may provide a QoA for an access user, such as the apparatus. A list of available spectrum in the shared spectrum that may conform to the QoA and may be allocated for use by the access user may be received. The spectrum may be determined from the list of available spectrum. It may be determined that the available spectrum may be larger than the spectrum requested. A spectrum use message may be sent to request that the spectrum be allocated for use by the access user. An allocation message indicating that the spectrum may have been allocated may be received.

An alternate spectrum may be determined from the list of available spectrum. The alternate spectrum may be used by the access user when the spectrum may no longer be able to conform to the QoA. A spectrum reserve message may be sent. The spectrum reserve message may request that the alternate spectrum may be flagged for possible use by the access user when the spectrum may no longer conform to the QoA.

A method and an apparatus may be provided to manage requests for spectrum from a tier of shared spectrum. The apparatus may include a processor that may be configured to perform a number of actions. A spectrum request message may be received that may include a tier of a shared spectrum and a QoA for an access user. The QoA may be associated with exclusive use of the spectrum by the access user for an area, a time, a percentage of time, a scrambling code or the like. The QoA may be associated with a noise level of the spectrum that may be below an acceptable level of the access user. The access user may be a WTRU, an access point, or a base station. Available spectrum in the tier of the shared spectrum may be determined. The available spectrum may conform to the QoA for the access user and may be able to be allocated to the access user. A list of the available spectrum may be sent to the access user. A spectrum use message that may request that the spectrum be allocated from the available spectrum for use by the access user may be received. The spectrum request message may include a frequency band that the spectrum may be within.

The spectrum from the available spectrum may be allocated for a user by the access user. It may be determined that the available spectrum may be within a requested frequency band. A spectrum reserve message may be received that may request that an alternate spectrum from the available spectrum may be flagged for possible use by the access user. The alternate spectrum may be allocated for us by the access user when the spectrum may not be able to conform to the QoA.

A method and an apparatus may be provided reallocate spectrum. The apparatus may include a processor that may be configured to perform a number of actions. A QoA event message may be received from an access user that may indicate a QoA may have degraded for a spectrum segment. A reallocation request may be received. The reallocation request may request that the spectrum segment may be replaced by a replacement segment from a tier of a shared spectrum. The reallocation request may include a frequency band that the spectrum may be within. Available spectrum that may conform to the QoA and may be allocated to the access user may be determined A list of available spectrum may be sent to the access user. The available spectrum may be within a requested frequency band. A replacement segment from the available spectrum may be assigned to the access user. The access user may be a WTRU, an access point, or a base station. The spectrum segment may be released when it may no longer be allocated for use by the access user A method and an apparatus may be provided to request that spectrum be reallocated. The apparatus may include a processor that may be configured to perform a number of actions. It may be determined that a spectrum segment may no longer conform to a QoA. A QoA event message may be sent to a shared spectrum manager (SSM). The QoA event message may indicate that the QoA may have degraded for the spectrum segment. A reallocation request may be sent to request that the spectrum segment be replaced with a replacement segment in a tier of a shared spectrum. A list of available spectrum that may be in the tier of the shared spectrum and that may conform to the QoA may be received. The replacement spectrum may be determined from the list of available spectrum.

Operations may be performed in a tiered hierarchical shared spectrum. For example, operations may be performed in a three-tiered system that may include television whitespace (TVWS); the industrial, scientific, and medical (ISM) band; a federal sharing spectrum, such as the 3.5 GHz band, or the like.

In a three-tiered system a bandwidth request to a spectrum manager may take into account the Quality of Operation (QoO) or a QoA of the requesting access user. Spectrum allocation policies may be used to meet the QoO guarantees requested by an access user and may provide optimal usage of the spectrum and revenue generated from the spectrum users. Spectrum allocation policies may allow spectrum to be organized and managed dynamically while maintaining the QoO guarantees.

In a three-tiered system, an allocation may not be over a single band. The spectrum segments that may be allocated to an access user may be over multiple bands and may be managed by the same entity. Channel evacuation may depend on the type of access user, such as a primary access user (PAU), a secondary access user (SAU), and a general authorized access user (GAAU). Channel evacuation may depend on the priority of the access user. For example, one SAU may have priority over another SAU. In tiered hierarchical shared spectrum, the segments may be of different sizes.

Disclosed herein are methods and apparatus for shared access systems, such as methods and apparatus that allow operation in a three-tiered shared spectrum architecture. A Shared Spectrum Manager (SSM) may organize spectrum segments. The SSM may communicate with access users of different priority and may allow the access users to request spectrum, bid for spectrum, manage spectrum, or the like. The SSM may manage admission of access users (e.g. allocation of spectrum to users) and operation with a spectrum request. The spectrum request may provide a range between a minimum (guaranteed) and maximum quality of operation. The SSM may also manage the way an access user may use the assigned spectrum.

A shared spectrum access (SSA) system may be a system that may include a spectrum manager and a plurality of users that may operate in shared spectrum across a series of bands that may or may not be contiguous. The SSA may include a shared spectrum manager.

A shared spectrum manager (SSM) may be a centralized or distributed entity that may manage shared spectrum across a band or a series of bands. A band may have its own policies, rules, and/or interfaces for users.

An access user (AU) may be a network, system, or operator that may wish to operate on shared spectrum. There may a number of different classes of access users, such as a Primary Access User (PAU), Secondary Access User (SAU), General Authorized Access User (GAAU).

A spectrum segment may be a portion of the spectrum that may be managed by the SSA. Segments may or may not be of the same size.

Quality of Operation (QoO) may include a quality metric that may be associated with the shared spectrum or a specified portion of the shared spectrum. QoO may refer to capacity, throughput, time of operation, spectral efficiency obtained over the spectrum, or the like. The QoO of an access user may include a value indicative of the effectiveness of the spectrum usage by that AU.

A guaranteed QoO may include an amount of spectrum that may be used for a location and for a time period where exclusive operation may be possible. For example, a guaranteed QoO may be 20 Mhz where with an exclusivity in time of 30%. Exclusivity in time may be in subsets of spectrum, in code, frequency, or the like. Guaranteed QoO may also be referred to as guaranteed quality of access (QoA). QoA may also be a protection criteria and an amount of spectrum that may be used for a location area with a guaranteed exclusivity, such as exclusivity in time, in subsets of the spectrum, in code, or the like. For example, QoA may be 20 MHz with a max noise level of −90 dBm and 100% exclusivity in time.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
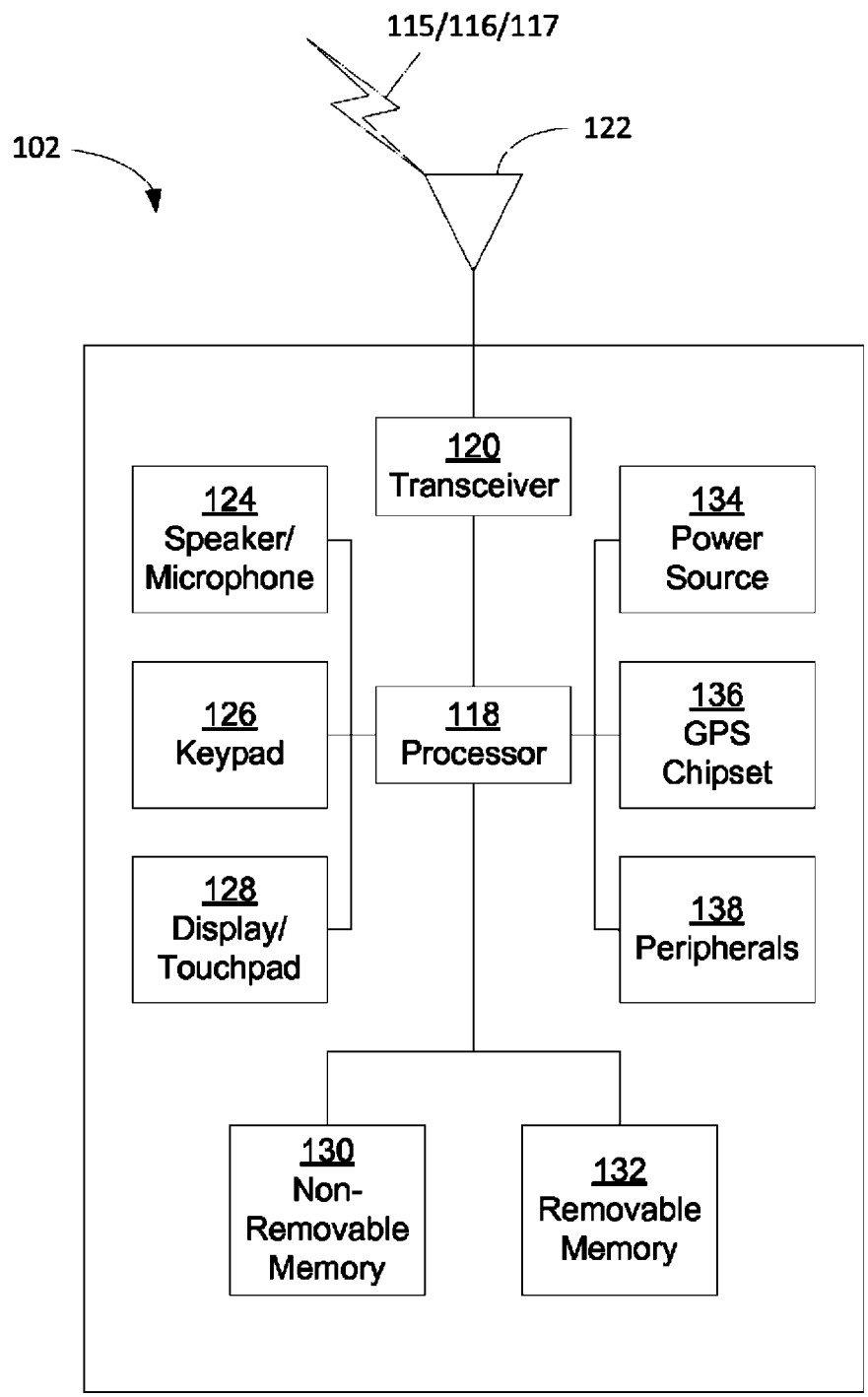
FIG. 1B depicts a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
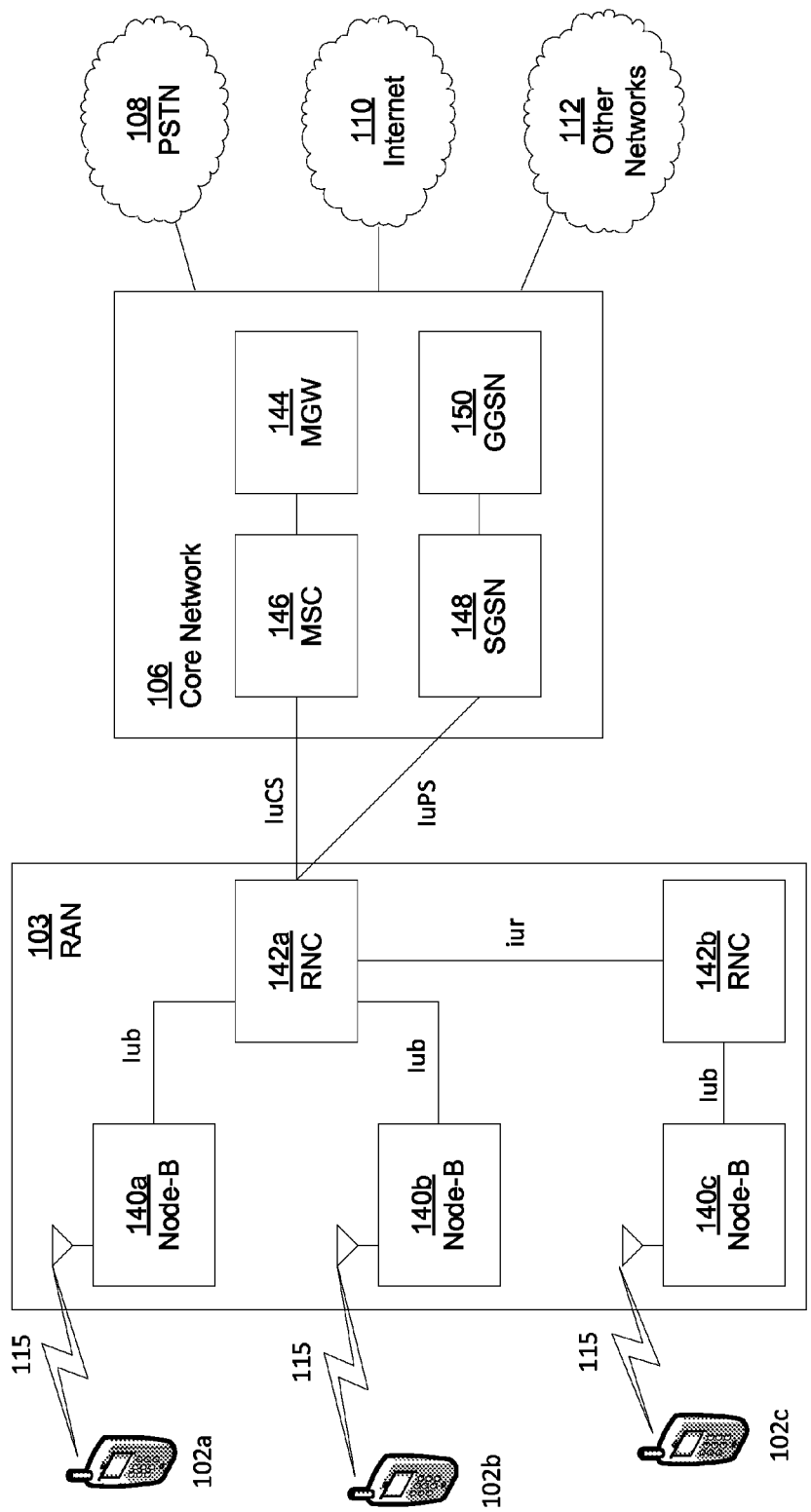
FIG. 1C depicts a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
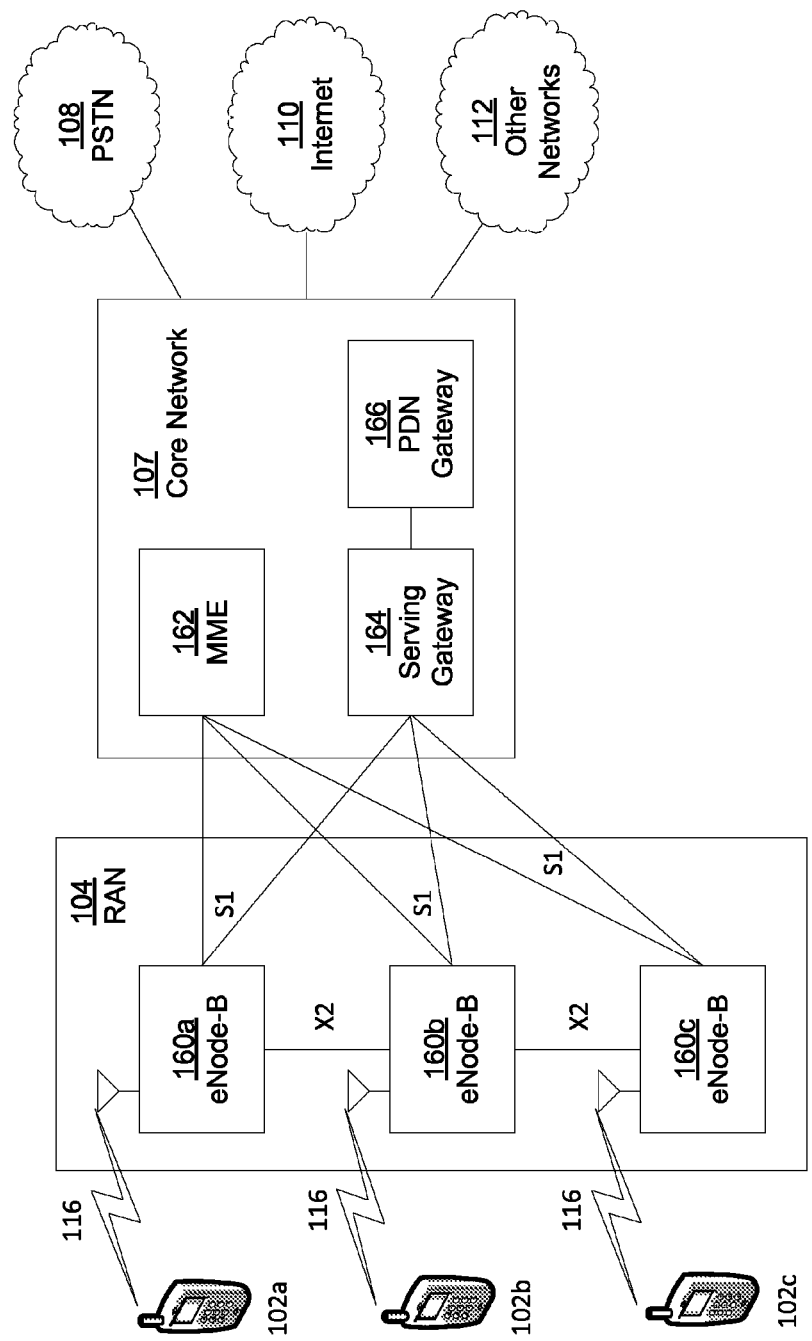
FIG. 1D depicts a system diagram of an example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
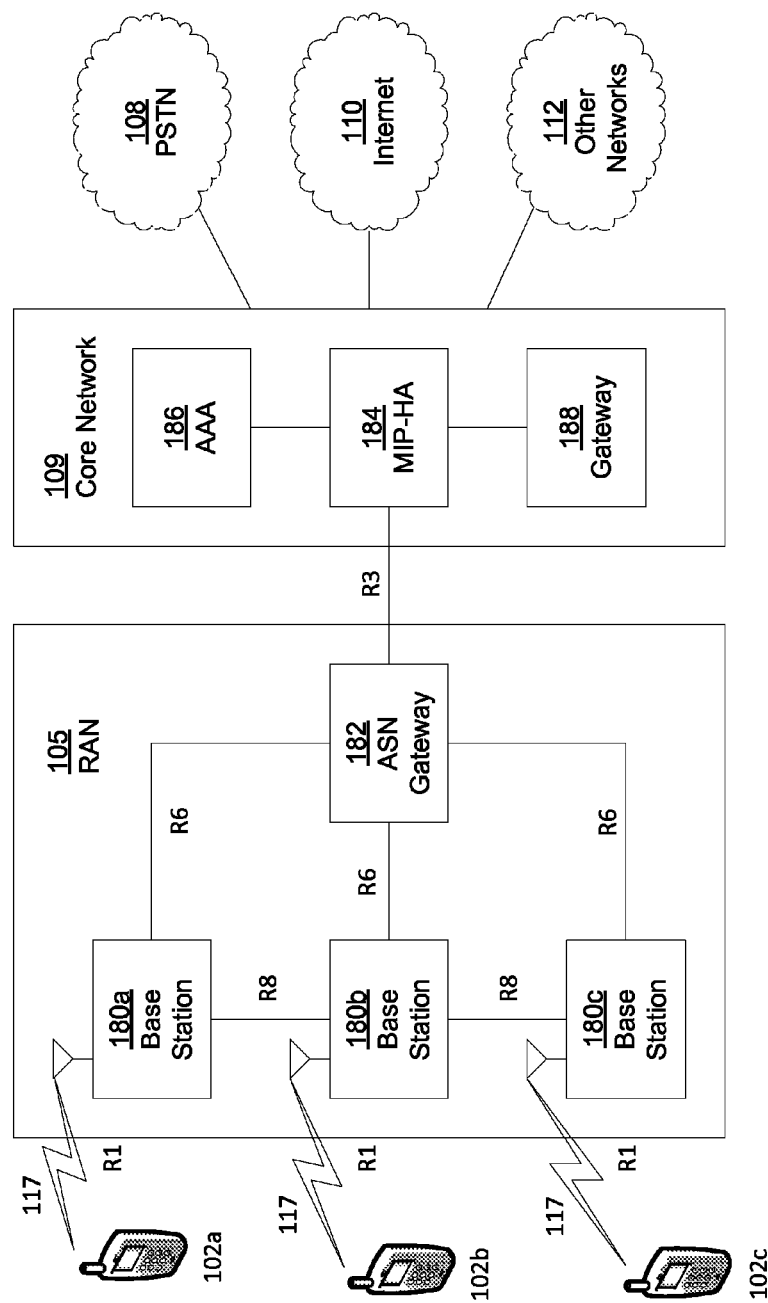
FIG. 1E depicts a system diagram of an example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 2:
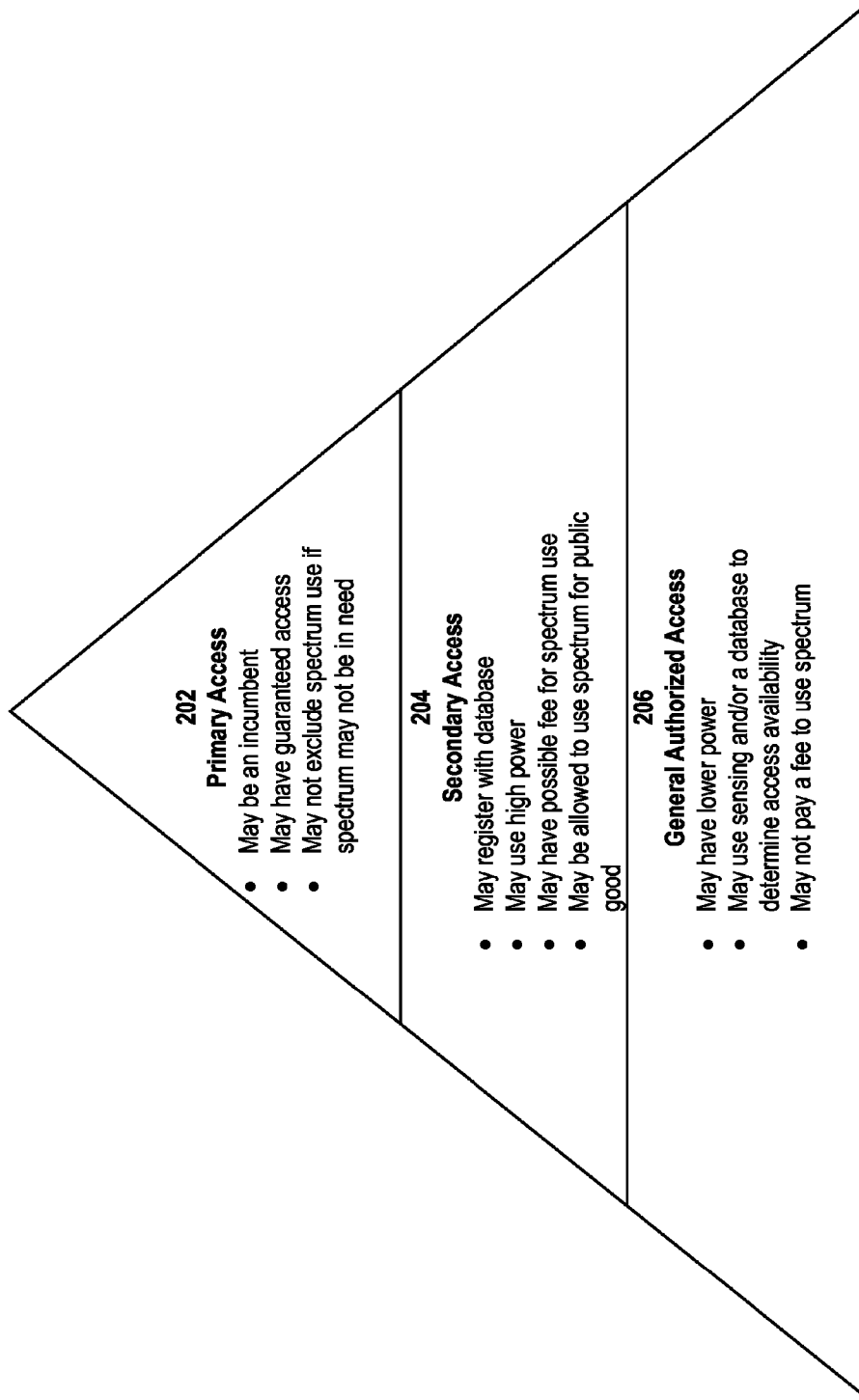
FIG. 2 depicts an example of a three-tier hierarchy system for access to a shared spectrum.

FIG. 2 depicts a three-tier hierarchy system for access to a shared spectrum. The shared spectrum may be, for example, a federal spectrum. As shown in FIG. 2, the three-tier system may include a primary access at 202, a secondary access at 204, and a general authorized access at 206. The primary access at 202 may provide a WTRU with guaranteed access. The primary access may be an incumbent. An incumbent may refer to a primary user in a given spectrum. For example, in TVWS spectrum, a DTC or a microphone may be incumbents of that spectrum. As another example, in a federal sharing spectrum, such as the 3.5 GHz spectrum, an incumbent may be a radar. The primary access at 202 may not exclude spectrum use by the secondary access and/or the general authorized access if the spectrum may not be used or may not be in need by the incumbent. For example, if an access user requests primary access to a shared spectrum and the primary access may not be in need, then the access user may be provided with spectrum from the primary access.

At 204, the secondary access may request that an access user register with a database before the access user may use the secondary access. This may be done, for example, to track access users that may use the secondary access so that those users may be managed and or moved to other spectrum segments. The secondary access at 204 may be high power, may charge a fee for spectrum use, and may allow public usage. At 206, the general authorized access may be low power, may sense access users to determine access availability, may use a database to determine access availability, and may not charge or pay a fee to use spectrum.

A shared spectrum manager (SSM) may be provided. The shared spectrum manager may manage spectrum across a series of bands or segments. A segment may be a managed portion of a band. The management of a segment may be subject to spectrum policies or rules. The SSM may interface to various access user (AU) systems, collect information from the access users, store the information for the access users, or the like. The information collected from the access users may include spectrum usage, operation information, or the like. The SSM may monitor the usage of an access user assigned to a segment, may organize the information for the segments, may make use of this information to maximize the spectrum usage based on certain metrics, may assign reserved spectrum to an access user, or the like. The SSM may announce usage pricing for a segment, announce the allowable access user types (e.g. PAU, SAU, and GAU) for a segment, announce the usage rules that may be applied for a segment, or the like. The SSM may manage a plurality of shared spectrum bands under a shared framework. This may be done, for example, using a shared communication interface that may be used between the SSM and an access user.

The SSM may be in one functional entity, or may be in a number of connected functional entities. These entities may be responsible for allocating spectrum segments to access users. Allocation may be done, for example, based on a negotiated agreement, based on reports from the access users regarding performance and metrics, or the like. The negotiation may handle pricing (e.g. how much the access user may pay), capability issues (e.g. determining whether the access user may be capable of using segments that may have been assigned), priorities among different access user types (e.g. a PAU may have a higher priority over a SAU, and GAU and SAU may have a higher priority over SAU), or the like.

Functionalities, such as the spectrum assignment and selection, may be distributed between the SSM and the access users. For example, upon request, the SSM may announce the spectrum availability based on the access users types for a location. As described herein, the availability information may be complemented with pricing information. Availability information may also include the area size in which the spectrum may be available and the period in which the spectrum may be available under the terms announced. The area size may be based on the user location. An access user may select one or more segments to meet its QoO demands. The access user may select the one or more segments, for example, based on the price of a segment, the network capability of a user for operating in these segments, or the like. The selection information may then be reported back. Some functionality of the SSM may be distributed. For example, spectrum requests that may original from a collection of access users may be handled by a self-organized network (SON) processor. The SON processor may relay and/or process a subset of requests, or an aggregation of requests, to one or more spectrum brokers. As another example, a centralized radio resource manager may mange spectrum for a collection of access users in an area. The centralized radio resource manager may relay and/or process a subset of requests, or an aggregation of requests, to one or more spectrum brokers.

An access user communication interface may be provided for use with an SSM. The SSM system may collect information from the various access users and may provide information to the access users. For example, a communication protocol may be used between an access user and a SSM to exchange the information.

A PAU may inform a SSM that a segment or subset of a segment may become available for sharing within an area. This may be done, for example, to decide that it may not use the segment or the subset of the segment. This may trigger incentives or benefits for the PAUs that may be based on how the shared spectrum may later be used.

An access user may register with a SSM and may provide anticipated spectrum usage, location area, known identification, capability, or the like. An access user may send a spectrum request for a segment, a subset of a segment, or for a specific location to the SSM. The spectrum request may include a QoO, a guaranteed QoO, and/or a maximum QoO for the segment. The spectrum request may include information on the anticipated usage for the spectrum such as a technology, a transmission power, an anticipated mobility behavior, a capability, a coexistence scheme, a feature detection schemes, or the like. The access user may report usage and performance metrics for a segment and a location.

The SSM may respond to a spectrum request by accepting the request, providing usage information, rejecting the request, proposing a spectrum allocation that may be under a revised terms of conditions that may include pricing, or the like. The SSM may inform or announce that a segment may be available for sharing and may provide details regarding how and when a spectrum may be taken back. The SSM may provide policies that may guide how the spectrum or segment may be used. The SSM may provide information about the segment, such as the guaranteed QoO supported, the max QoO supported, or the like. The SSM may send evacuation messages to access users. This may occur, for example, on the arrival of a PAU to a spectrum segment. The SSM may send channel reorganization messages to the access users. This may be done, for example, to reorganize and/or reallocate spectrum.

A SSM may organize spectrum. For example, a shared spectrum manager (SSM) of an SSA system may organize spectrum segments into categories, such as category A, category B, category C, or the like.

Category A segments may be reserved for spectrum segments that may carry a PAU. A PAU may have notified the SSM that it may share its spectrum at a time and/or location. The PAU may begin operation at any given time and may expect a SAU and/or GAAUs may evacuate the segment. A PAU may also inform the SSM of the type of evacuation that may be used.

Various types of evacuation may be used. For example, an urgent evacuation may be requested. An urgent evacuation may be where an access user, such as a PAU, may request evacuation of its allocated segment(s) without delay. In an urgent evacuation, the SSM may move SAUs and GAAUs to other segments. As another example, a non-urgent evacuation may be requested. A non-urgent evacuation may be where an access user may request that the SSM move SAUs and GAAUs to other segment(s) when it may be appropriate to do so. For example, the SSM may move the SAUs and GAAUs after a delayed. As another example, a limited coexistence may be requested. A limited coexistence may allow SAUs or GAAUs to coexistence on a segment with a PAU.

Spectrum segments that may not be categorized in category A may be available for category B and category C. For example, spectrum segments that may belong to PAUs that may not be used at a given location, may not be used for a given time, or may not be owned by a primary access user (such as ISM and TVWS bands), or the like may be categorized as category B or category C segments. Category B spectrum may be used by Secondary Access Users (SAUs) and/or General Authorized Access Users (GAAUs), while Category C segments may be reserved for (GAAUs).

A category of a spectrum segment may be a function of location. Using TVWS as an example, channel #x may be of category A in a first location, with a DTV broadcast station operating on channel #x, while the same channel #x may be of category B in a second location, where DTV stations may not operate.

The SSM may reserve a portion of the spectrum for category C use for SSM mechanisms. Spectrum that may not be for category A may be split between category B and C according to a percentage split. The percentage split of the remaining spectrum between category B and category C may be dynamic and may be determined by the SSM to optimize spectrum utility based on certain metrics.

Access users may be allowed in some categories, but may not be allowed in others. For example, for category A, spectrum segments may be used by PAUs, SAUs, and GAAUs. For category B, spectrum segments may not have an active PAU, but may be used by SAUs and GAAUs. For category C, spectrum segments may not have an active PAUs or an assigned SAUs, as the spectrum segments may be reserved for use by GAAUs.

A number of category B spectrum segments may be assigned different priorities, such as B1, B2, B3, or the like. Higher priority SAUs may use category spectrum with a higher priority. For example a higher priority SAU may be assigned category B1 segments, while a lower priority SAU may be assigned category B2 segments.

The SSM may maintain status information for the spectrum segments. The status information may be referred to as a spectrum status map. The spectrum status map may include PAU information such as time of operation, location of operation, evacuation type, transmitted power, technology type, or the like. For example, the spectrum status map may include PAU information for category A. The spectrum status map may include SAU information such as priority, technology type, transmitted power, QoO information (e.g. negotiated QoO and monitored QoO that may be reported by SAU), contact information (e.g. where the SAU may be reached in case of evacuation), sharing mechanism with other SAUs, or the like. The sharing mechanism may be, for example, CSMA, TDM-based (gaps), FDM-based (sub-carriers), none, or the like. The SAU information may be for category A and B segments. The spectrum status map may include GAAU information such as priority, technology type, transmitted power, QoO information (e.g. negotiated QoO and monitored QoO that may be reported by GAAU), contact information (e.g. where the SAU may be reached in case of evacuation), sharing mechanisms with other SAUs (such as CSMA, TDM-based, FDM-based, none, etc.), or the like. The GAAU information may be for Category A, B, or C segments. The spectrum status map may include information regarding the validity of the current assignment in this spectrum segment, such as the location at which an assignment may be valid, the time of validity, or the like.

Access user administrative control may be provided. The SSM may use a spectrum status map to allocate spectrum to access users.

An access user (network, system or operator) may send a message to the SSM to request bandwidth. The message may include a technology type that may be deployed in a bandwidth, such as LTE, Wi-Fi, or the like. The message may include an AU capability indicator, a QoO range, or the like. The QoO range may include a guaranteed QoO and/or a max QoO. The guaranteed QoO may include an amount of spectrum that may be used for a location area with exclusivity. Exclusive use may be for a time, for a subset of a spectrum, or a code, or the like. For example, a guaranteed QoO may be 20 MHz with a 30% guaranteed exclusivity in time. A max QoO may include an upper limit usage of an amount of spectrum for a location area. The message sent by the access user to the SSM may include preferred ranges for time of operation, priority, and/or sharing mechanism supported. The message may include the location of the user, a range, transmit power characteristics that may include in-band and out-of-band power, or the like.

The SSM may use the technology type and information about transmit power characteristics to allocate a user to a bandwidth where users of compatible technologies may coexist and may already be occupying.

A user may be able to operate with a QoO, such as a guaranteed QoO, and may be able to operate up to the maximum QoO. The guaranteed QoO may, for example, be used as a safe guard for secondary users such as public safety user. The SSM and a user may cooperate to ensure the guaranteed QoO of other users. The SSM and users may also use QoO ranges for bandwidth management as described herein.

The maximum QoO of users, such as SAU or GAAU, may be used by the SSM to optimize spectrum utilization. For example, to service a spectrum request from a user (e.g. a SAU), the SSM may reduce the maximum QoO of exiting users and may continue to ensure the guaranteed QoO of the users.

A user or operator may perform admission control as either a SAU or a GAAU. In the case of a GAAU, the user may not request a QoO range, in which case, the GAAU may be given best-effort usage of the channel.

A user or operator may request bandwidth segments in different categories. For example, an operator may have some small cells or portions of the network that may operate as an SAU, while other small cells or portions of the network may operate as a GAAU. As another example, a small cell may aggregate some spectrum with a guaranteed QoO and may aggregate some additional QoO that may be best effort and may not have strict QoO requests. The user may request the two types of segments and may request an amount of bandwidth for the segments.

SSM driven channel assignment may be provided. The Shared Spectrum Manager (SSM) may allocate a bandwidth to a user with a QoO range for a time. The SSM may reorganize channel allocation at different times or events. For example, the SSM may reorganize channel allocation periodically across users, aperiodically to users according to their allocation time, aperiodically because of an occurrence of a system event, or the like. A system event may be congestion on a channel in a spectrum segment, may be when a SAU frees up the usage of a bandwidth, or the like. A system event may be when a PAU that may have begun operating on a channel in a spectrum segment on which a SAU that may have already been operating on. This may, for example, cause the SAU to evacuate the channel and to request bandwidth allocation.

The SSA channel reorganization may include a number of actions. For example, SSA channel reorganization may include reassigning a user to another available bandwidth, such as available bandwidth that may be in spectrum segment A or B. This may be done, for example, to ensure a QoO for the user. SSA channel reorganization may include requesting a user to increase its maximum QoO level when a bandwidth may be less congested. SSA channel reorganization may include optimizing the bandwidth usage even if there may not be congestion. For example, a SSM may request a user (or multiple users) to vacate a bandwidth and start operating on a bandwidth that may be allocated to another user (or multiple users). The SSA may make segments available. SSA channel reorganization may include requesting a user to change its user type (SAU or GAAU).

SSA channel reorganization may include requesting a user to lower a maximum QoO level while maintaining it above a QoO. This may occur in a number of scenarios, such as when a second user requests a bandwidth and a SSM allocates a bandwidth that may already be in use by a first user. For example, the SSM may send a message to the first user requesting that the first user to lower a maximum QoO to allow the second user to operate.

A user may be requested to lower a maximum QoO level while maintaining it above a QoO when congestion limits another user from operating on a QoO that may be guaranteed. For example, a SSM may send a message to a user instructing the user to lower its maximum QoO such that other users may be able to operate at their guaranteed QoO.

An access user driven channel or spectrum reassignment may be provided. An AU, such as a Tier 2 AU, may be assigned a channel or spectrum for a time to operate above a QoA, such as a guaranteed QoA. A spectrum may include a number of channels. The AU may monitor the quality of its operation on the assigned channel(s) that may be using. The AU may also monitor other channels in the background that may be used in the future. The AU may transmit metric results from the channel motoring to an SSM. When another AU may use a channel in proximity of the location of the AU, the AU may experience a degradation of its QoO, which may be below the QoA for the AU. The AU may inform and/or alert the SSM regarding the degradation of its QoA. For example, the AU may send a QoA event message to the SSM. The AU may request a new channel reassignment to replace the affected channel. The request may indicate one or more channels that may be used, which may be channels that may have been monitored in the background.

Figure 3:
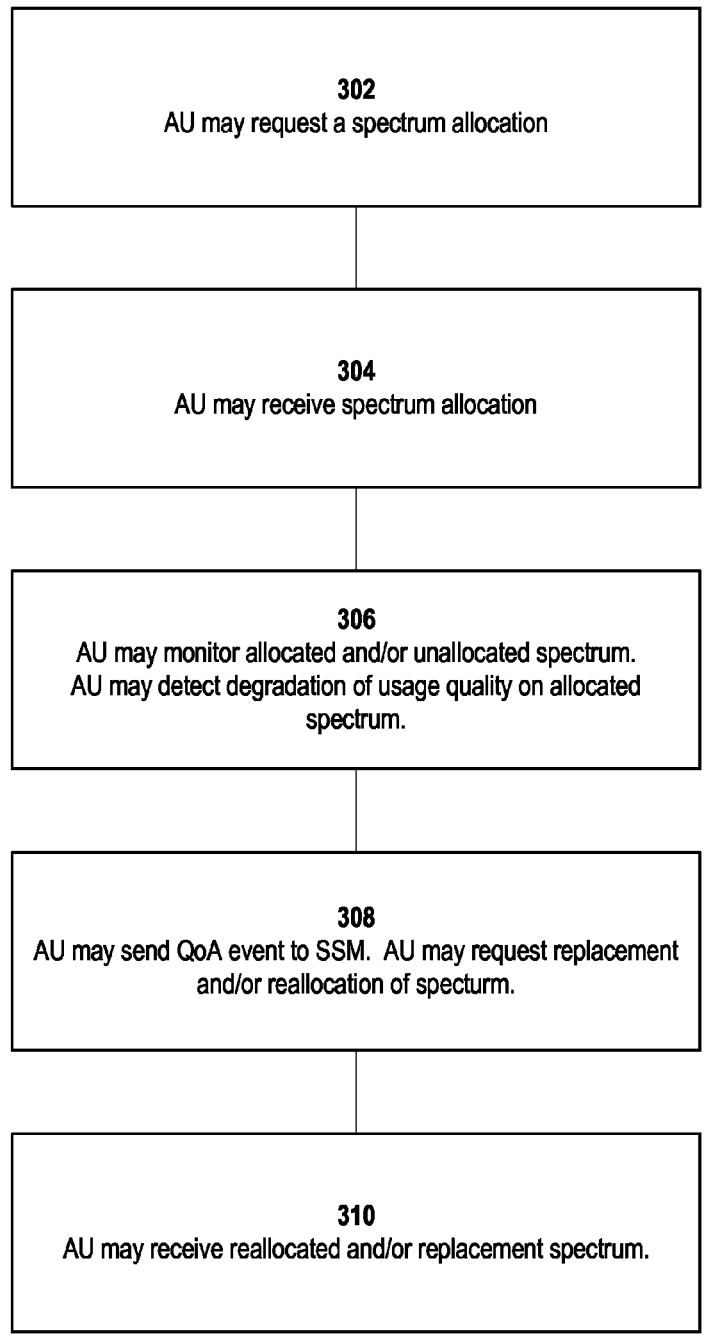
FIG. 3 depicts an example of a procedure for reallocating spectrum when a quality of access (QoA) event occurs.

FIG. 3 depicts an example of a procedure for reallocating spectrum when a quality of access (QoA) event occurs. At 302, an AU may request a spectrum allocation. The spectrum may be a shared spectrum that may be categorized in a number of tiers. The AU may request that the allocation of spectrum come from a tier of the shared spectrum. The AU may request that spectrum to be allocated conform to a QoO, a QoA, a guaranteed QoO, a guaranteed QoA, or the like. The AU may request the spectrum to be allocated be within a frequency band, such as 3.5 GHz; be within of a technology type, such as Wi-Fi; be within a signal-to-noise ratio; be a percentage of time to use a spectrum; a combination thereof, or the like. For example, an AU may request an allocation that may allow the AU to use the spectrum for 50% of the time.

At 304, the AU may receive a spectrum allocation. The spectrum allocation may include spectrum from the shared spectrum. The spectrum that may be allocated may be for a tier, or a number of tiers. The spectrum that may be allocated may be for the requested tier. For example, the AU may have requested spectrum from tier 2 of the shared spectrum and the allocated spectrum may be from tier 2 of the shared spectrum. The spectrum that may be allocated may not be for the requested tier. For example, the AU may have requested spectrum from tier 2 of the shared spectrum and the allocated spectrum may be from tier 1 of the shared spectrum. As another example, the AU may have requested spectrum from tier 2 of the shared spectrum and the allocated spectrum may be from tier 2 and tier 3 of the shared spectrum.

The spectrum that may be allocated may conform to a QoA, which may be the QoA requested by the AU. The AU may request that the spectrum to be allocated may conform to a QoA and the allocated spectrum may not conform to the requested QoA. For example, the QoA for the allocated spectrum may be higher than the requested QoA when the SSM may be able to provide better or more spectrum. As another example, the QoA for the allocated spectrum may be lower than the requested QoA when the SSM may not be able provide spectrum that may conform to the requested QoA. This may be done, for example, when the SSM may not have spectrum and may attempt to find spectrum that may match other spectrum characteristics requested by the AU.

The spectrum that may be allocated may be within a frequency range requested by the AU. For example, the AU may request a bandwidth or spectrum segment of 50 Mhz wide and the SSM may allocate a spectrum within the 50 Mhz range. The AU may request that the spectrum be allocated within a frequency range and the spectrum allocated by the SSM may be greater than the requested frequency range. For example, the AU may request a 50 Mhz range, and the SSM may provide the AU with a 100 MHz range from which the AU may select a 50 MHz range to be allocated. The SSM may then allocate the 50 MHz range the AU selected from the 100 MHz range to the AU. The AU may request that the spectrum to be allocated be within a frequency range and the spectrum allocated by the SSM may be smaller than the requested frequency range. For example, the AU may request a 50 MHz range and the SSM may allocate a spectrum within a 25 MHz range. This may be done, for example, when the SSM may not have spectrum in the requested frequency range and may attempt to find spectrum that may match other spectrum characteristics that may be requested by the AU.

The spectrum that may be allocated may be of a technology type, which may be the technology type requested by the AU. For example, the AU may request that the spectrum to be allocated may be LTE spectrum and the SSM may allocate LTE spectrum to the AU. The AU may request that the spectrum to be allocated may be of a technology type and the allocated spectrum may be of a different technology type. For example, the AU may request that the spectrum to be allocated may be HSPA+spectrum and the SSM may allocate Wi-Fi spectrum to the AU. This may be done, for example, when the SSM may not have spectrum that may attempt to find spectrum that may match other spectrum characteristics that may be requested by the AU.

At 306, the AU may monitor allocated and/or unallocated spectrum. The AU may use the allocated spectrum. The AU may monitor the allocated spectrum, for example, the AU may operate on the allocated spectrum at or above a QoA. The AU may monitor unallocated spectrum, for example, to determine the QoO of the unallocated spectrum. The AU may send the SSM metrics from allocated spectrum, the unallocated spectrum, or a combination thereof.

The AU may detect a degradation of usage quality on the allocated spectrum. For example, the AU may detect a degradation of QoO for the allocated spectrum. The AU may determine the degradation of QoO may be below or near the QoA for the allocated spectrum.

At 308, the AU may send a QoA event to a SSM. The QoA event may be a message that may notify the SSM that the AU may have detected a degradation of usage quality. For example, the QoA event may indicate that the OoO for the allocated spectrum may be below or near a QoA for the allocated spectrum. The AU may request replacement and/or reallocation of spectrum. This may be done, for example, to allow the allocated spectrum to be replaced such that the AU may receive spectrum that may conform to a QoA.

At 310, the AU may receive reallocated and/or replacement spectrum. The SSM may receive a request for reallocation and/or replacement spectrum. The SSM may determine unallocated spectrum that may conform to a QoA requested by the AU. The unallocated spectrum may supplement allocated spectrum. For example, the SSM may provide the AU with additional spectrum that may be used by the AU along with the allocated spectrum such that AU may be able to operate at or above the QoA. The unallocated spectrum may replace the allocated spectrum. For example, the SSM may provide the AU with replacement spectrum that may replace the allocated spectrum such that the AU may be able to operate on the replacement spectrum at or above the QoA. The SSM may reallocate spectrum. For example, the SSM may determine that spectrum may be taken from other AUs and may be provided to the AU that requested reallocation and/or replacement spectrum.

Figure 4:
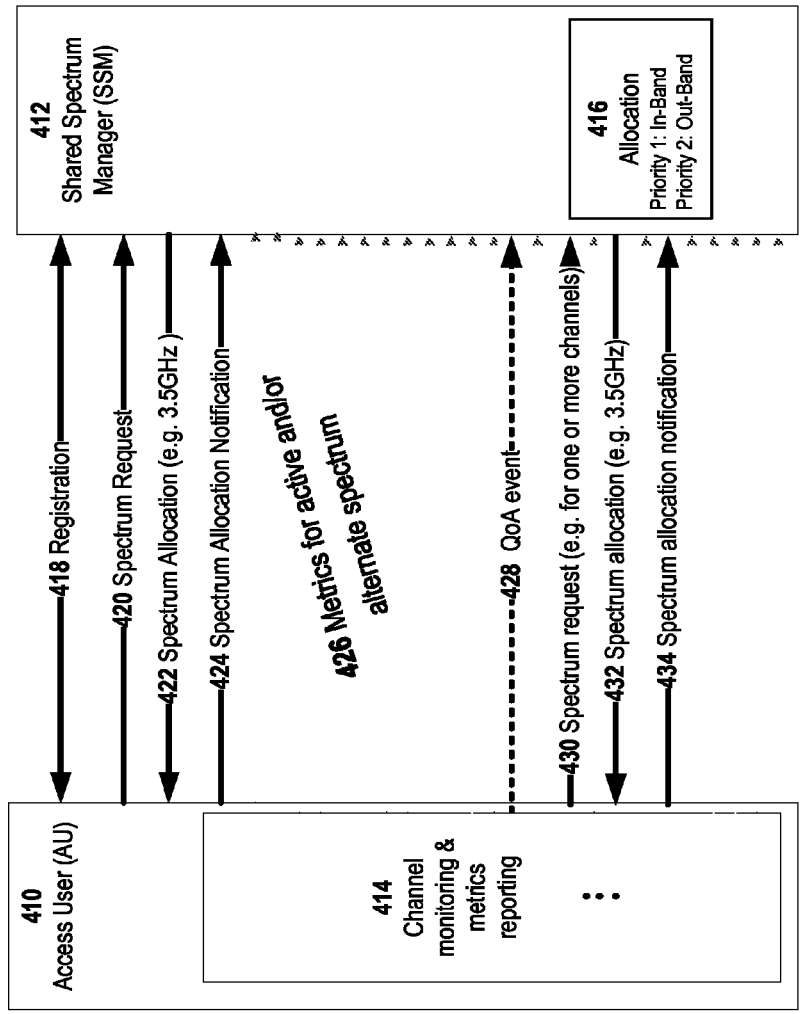
FIG. 4 depicts another example of a procedure for reallocating spectrum when a QoA occurs.
Figure 4:
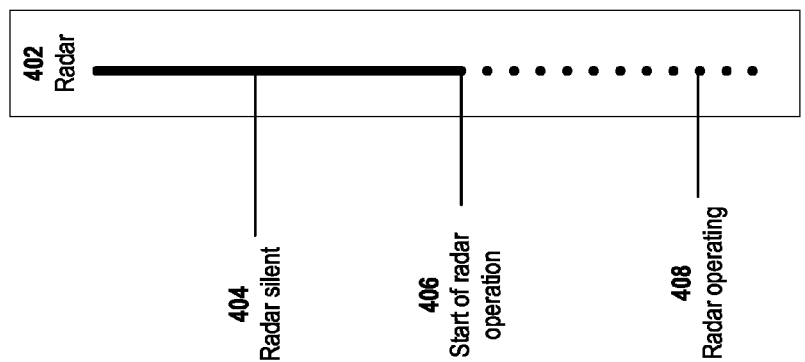

FIG. 4 depicts another example of a procedure for reallocating spectrum when a QoA occurs. The procedure for reallocating spectrum may be, for example, driven by an AU. An AU may use the channel reassignment procedure when the AU may experience degradation of its QoA. For example, as shown in FIG. 4, the AU may experience a degradation of its QoA when a shipborne radar approaches. Although radar is shown in FIG. 4, any incumbents or other unexpected users may create a QoA degradation.

At 418, AU 410 may register with SSM 412. This may be done, for example, so that the SSM may be able to identify and communicate with AU 410. AU 410 may be a tier 2 user. At 420, AU 410 may send a spectrum request to SSM 412. SSM 412 may determine unallocated spectrum that may be used by AU 410. The unallocated spectrum may include spectrum that may be used by radar 402.

At 422, SSM 412 may send a spectrum allocation message to AU 410. The spectrum allocation message may include the identity of spectrum that may be allocated to and used by AU 410. For example, the spectrum allocation message may include a range of spectrum, such as a spectrum segment within the 3.5 GHz, that may be allocated to and used by AU 410.

At 424, AU 410 may send a spectrum allocation notification to SSM 412. This may be done, for example, to notify SSM 412 that AU 410 may to use spectrum selected from the spectrum allocation message at 422. The spectrum allocation notification may allow SSM 412 to allocate spectrum that may have been selected by AU 410. For example, SSM 412 may provide a range of spectrum that may be available and may be used by AU 410. AU 410 may select spectrum it may use from the range of spectrum. AU 410 may notify SSM 412 that the selected spectrum may be allocated to AU 410.

At 414, AU 410 may perform spectrum monitoring and may perform metric reporting. For example, at 426, AU 410 may monitor active and/or alternate spectrum and may send metrics to SSM 412. This may be done, for example, so that the AU may monitor a QoO for allocated or active spectrum. The AU may monitor alternate channels or spectrum for future use. For example, the AU may request to use the alternate spectrum when the QoO for the allocated spectrum may degrade.

At 404, radar 402 may be silent and may not be transmitting. Radar 402 may be a tier 1 access user or a PAU and may operate in a spectrum that may be allocated to AU 410. At 406, radar 402 may start radar operation, which may cause the QoO for the spectrum allocated to AU 410 to degrade.

At 428, AU 410 may send a QoA event to SSM 412. AU 410 may determine that the QoO for the allocated spectrum may be below a QoA. AU 410 may send a QoA event to notify the SSM 412 that the QoO for the allocated spectrum may be below a QoA. AU 410 may send a QoA event to notify SSM 412 that the QoA for an alternate spectrum may be better than the QoO for the allocated spectrum.

At 430, AU 410 may send a spectrum request. The spectrum request may request SSM 412 to allocate spectrum from the alternate spectrum that AU 410 may have been monitoring. The spectrum request may request SSM 412 to replace the spectrum allocated at 424 with replacement spectrum. The spectrum request may request SSM 412 to provide spectrum that may be used to supplement the spectrum allocated at 424.

At 432, SSM 412 may send a spectrum allocation message to AU 410. The spectrum allocation message may include the identity of supplemental or replacement spectrum that may allocated to and used by AU 410. For example, the spectrum allocation message may include a range of spectrum within a 3.5 GHz band that may be allocated to and used by AU 410.

At 434, AU 410 may send a spectrum allocation notification to SSM 412. This may be done, for example, to notify SSM 412 that AU 410 has elected to use spectrum selected from the spectrum allocation message at 432. The spectrum allocation notification may allow SSM 412 to allocate spectrum that may have been selected by AU 410. For example, SSM 412 may provide a range of spectrum that may be available and may be used by AU 410. AU 410 may select spectrum it may use from the range of spectrum. AU 410 may notify SSM 412 that the selected spectrum may be allocated to AU 410.

Figure 5:
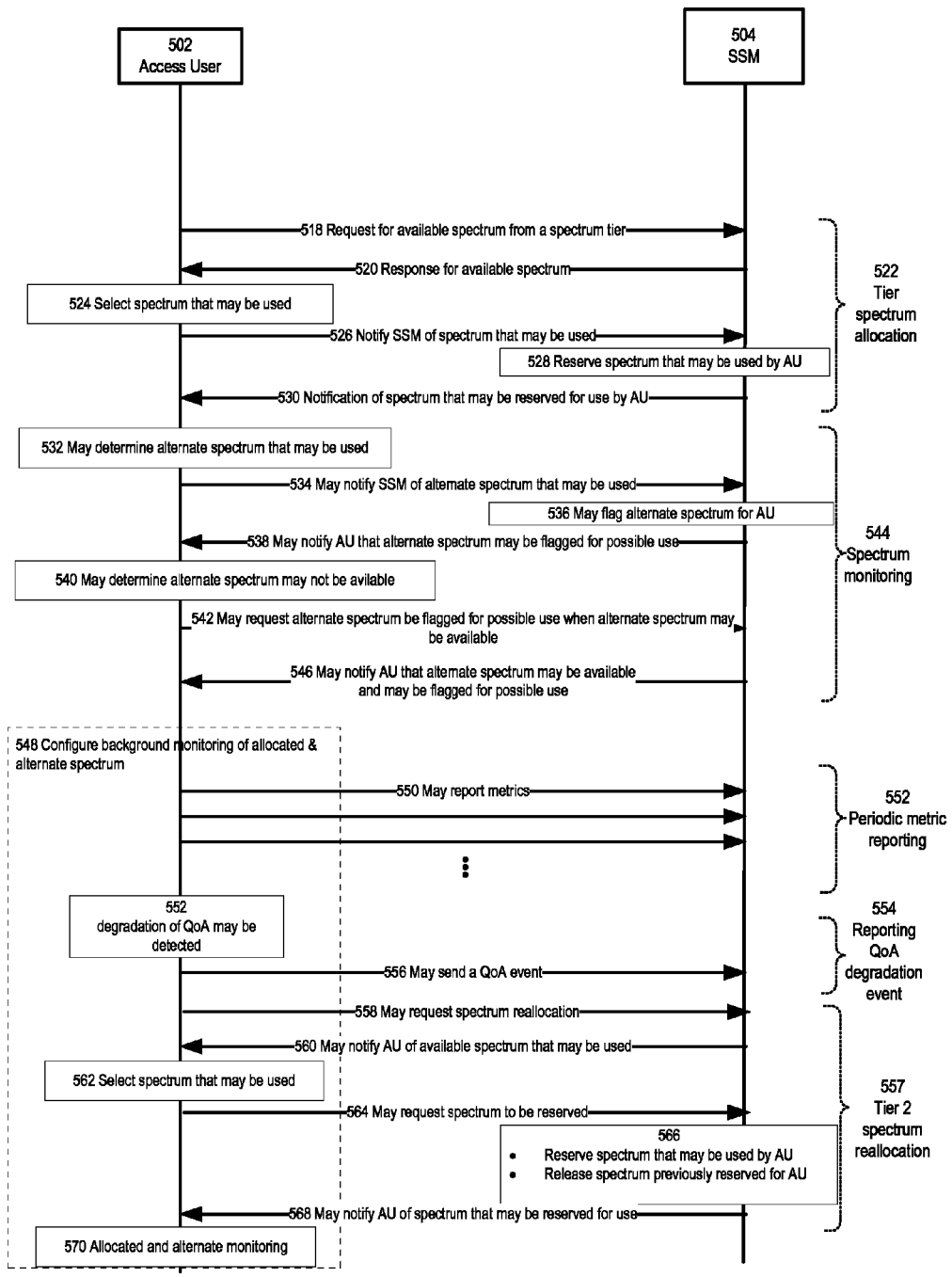
FIG. 5 depicts an example of a procedure for spectrum allocation and/or reallocation.

FIG. 5 depicts an example of a procedure for spectrum allocation and/or reallocation. At 522, tier spectrum allocation may occur. At 518, AU 502 may request available spectrum from a tier of a shared spectrum. At 520, SSM 504 provide available spectrum to AU 502. At 524, AU 502 may select spectrum from the available spectrum that may be used. At 526, AU 502 may notify SSM 504 of the spectrum that may be used. At 528, SSM 504 may reserve spectrum that may be used by AU 502. At 530, SSM 504 may notify AU 502 that the spectrum may be reserved.

At 544, spectrum monitoring may occur. At 532, AU 502 may determine alternate spectrum that may be used. At 524, AU 502 may notify SSM 504 of the alternate spectrum that may be used. At 536, SSM 504 may flag the alternate spectrum for future use by AU 502. At 538, SSM 504 may notify AU 502 that the alternate spectrum may have been flagged for possible use. At 540, AU 502 may determine that the alternate spectrum may not be available. At 542, AU 502 may request that the alternate spectrum be flagged for possible use when the spectrum may be available. At 546, SSM 504 may notify AU 502 that alternate spectrum may be available and may be flagged for possible use by AU 502.

At 552, periodic metric reporting may occur. At 548, AU 502 may perform monitoring of allocated and/or alternate spectrum. At 550, AU 502 may report metrics.

At 554, reporting a QoA degradation event may occur. At 552, AU 502 may detect degradation of a QoA. At 556, AU 502 may send a QoA event to SSM 504.

At 557, tier spectrum allocation, such as tier 2 spectrum allocation, may occur. At 558, AU may request spectrum reallocation. At 560, SSM 504 may notify AU 502 of available spectrum that may be used. At 562, AU 502 may select spectrum that may be used. At 564, AU 502 may request spectrum to be reserved. At 566, SSM 504 may reserve spectrum that may be used by AU 502 and may release spectrum that may have previously been reserved for AU 502. At 568, SSM 504 may notify AU 502 of spectrum that may be reserved for use. At 570, AU 502 may monitor allocated and/or alternate spectrum.

Figure 6:
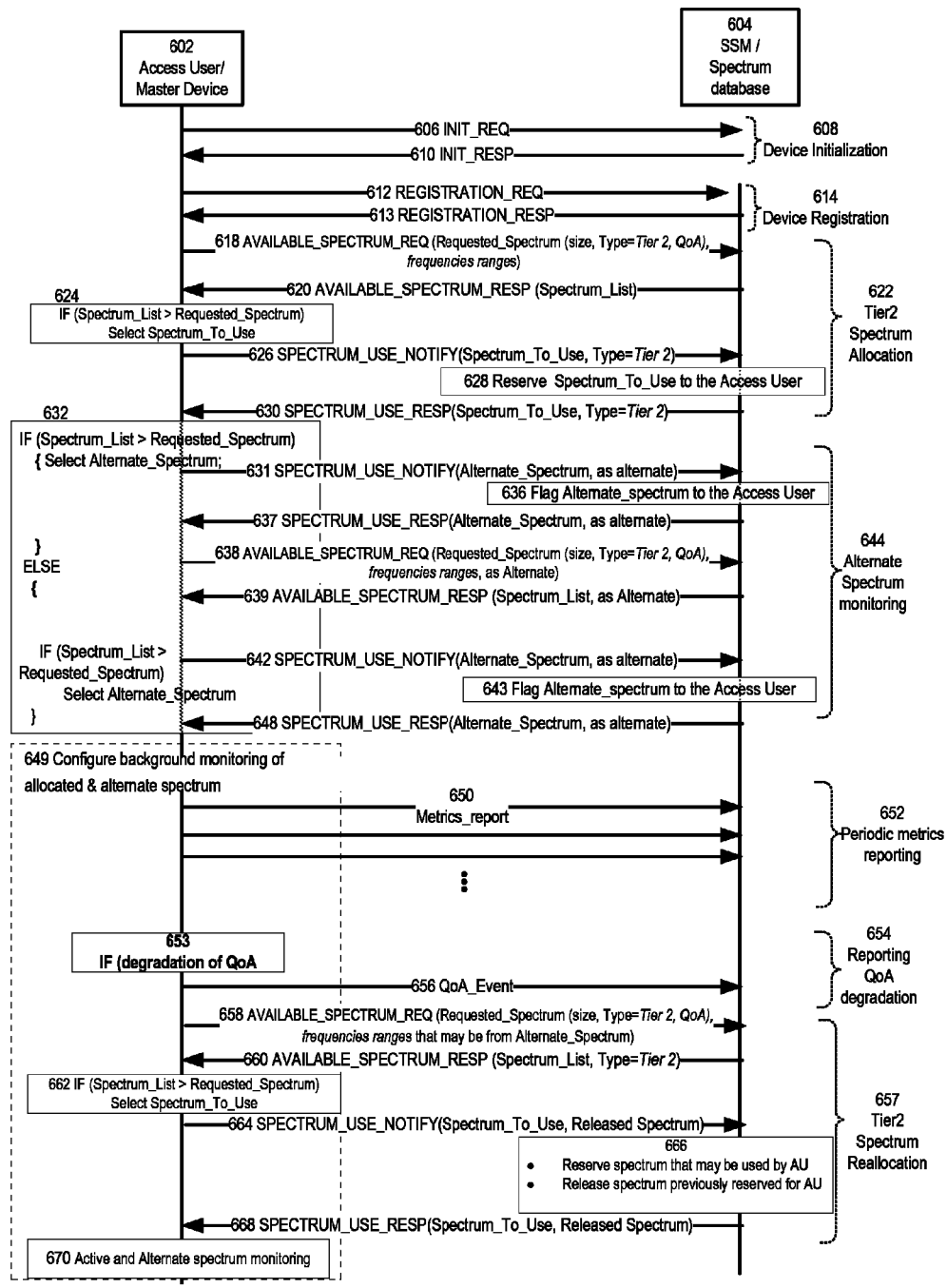
FIG. 6 depicts another example of a procedure for spectrum allocation and/or reallocation.

FIG. 6 depicts another example of a procedure for spectrum allocation and/or reallocation. The spectrum allocation procedure may be, for example, driven by an AU. An AU may use the spectrum allocation procedure when the AU may experience degradation of its QoA.

An AU, such as a tier 2 AU, may perform an initialization and may register with an SSM. The AU may request a spectrum allocation for a QoA usage. The AU may request additional spectrum to monitor its usage quality for future use as alternate spectrum. The AU may monitor the spectrum that may be in use and may be active. The AU may monitor alternate spectrum. The AU may and report resulting metrics for monitored spectrum to the SSM. On a degradation of the usage quality on spectrum that has been allocated, the AU may transmit to the SSM a QoA degradation event. The AU may request that the SSM reallocate and/or replace spectrum.

At 608, device initialization may occur. At 606, AU 602, which may be a master device, may send an INIT_REQ message to SSM 604, which may be a spectrum database. The INIT_REQ message may initialize AU 602 with SSM 604, such that SSM 604 may be able to identify AU 602 and may be able to communicate with AU 602. At 610, SSM 604 may send an INIT_RESP message to AU 602 to confirm that AU 602 may be initialized.

At 614, device registration may occur. At 612, AU 602 may send a REGISTERATION_REQ message to 604. The REGISTERATION_REQ message may register AU 602 within a spectrum database that may be controlled by SSM 604. At 613, SSM 604 may send a REGISTRATION_RESP message to AU 602 to confirm that AU 602 may be registered with the spectrum database.

At 622, spectrum allocation may occur. At 618, AU 602 may request spectrum from SSM 604 by sending a message, such as an AVAILABLE_SPECTRUM_REQ message. The message may include information such as a size of a requested spectrum, a type of requested spectrum access (e.g. tier 1, tier 2 or tier 3), a requested QoA (e.g. exclusivity over a frequency, exclusivity of access for a time, noise level lower than xdBm), a frequency ranges (ranges in 3.5 GHz or in TVWS bands . . . ), or the like. A tier 2 value may be an indication to reserve spectrum for the AU at the SSM side. The AVAILABLE_SPECTRUM_REQ message may include a cause of the request. A cause may be a configuration, a reconfiguration, or the like. A configuration cause may include an initial channel setup of the AU to start operation or set up an additional channel that may increase the AU operation capacity.

SSM 604 may select a list of spectrum that may match the size and quantity requested by AU 602. SSM 604 may generate the list of spectrum from the available spectrum that may conform to the requested QoA and frequency ranges. SSM 604 may select a higher size and quantity than what may have been requested by AU 602. SSM 604 my select spectrum of a higher QoA than what may have been requested by AU 602.

At 620, SSM 604 may send the selected spectrum list to AU 602 via a message, such as the AVAILABLE_SPECTRUM_RESP message. The message may include the type of spectrum access (for example, tier 2) for one or more spectrum in the list. The message may include a QoA that may correspond to a reported spectrum. For example, if the message may include more than one spectrum, the message may include a QoA for each of one or more spectrum.

At 624, AU 602 may determine that the spectrum list may or may not be empty. If the spectrum list may be empty, the AU may reduce the requested QoA, may change the size of the requested spectrum, may change the requested frequency range, and may resend an AVAILABLE_SPECTRUM_REQ message to SSM 604.

If AU 602 may determine that the spectrum list may not be empty, AU 602 may select the spectrum to use from the spectrum list. If the spectrum in the spectrum list is larger than the requested spectrum, AU 602 may select the requested spectrum from the spectrum list. At 626, AU 602 may notify SSM 604 of the spectrum that may be used by AU 602 via a message, such as the SPECTRUM_USE_NOTIFY message. The SPECTRUM_USE_NOTIFY may request SSM 604 to reserve spectrum for AU 602. This may include information from the AVAILABLE_SPECTRUM_REQ message. At 628, SSM 604 may reserve the spectrum for AU 602 and, at 630, may send to AU 602 a SPECTRUM USE RESP message that may confirm the reservation.

At 644, AU 602 may monitor alternate spectrum. For example, AU 602 may monitor the spectrum quality of alternate spectrum and may associate the measurements to its location. SSM 604 may have transmitted a list of spectrum to AU 602 in which part of that spectrum may not have been in use and AU 602 may elect to monitor the spectrum, or a part of the spectrum, that may not be in use. For example, AU 602 may consider spectrum in the list of spectrum that may not be used by AU 602 as alternate spectrum that may be used at a later time.

At 631, AU 602 may send a list of alternate spectrum to the SSM 604, via a SPECTRUM_USE_NOTIFY message. The message may include the information indicating that the list of spectrum is an alternate spectrum list for monitoring purposes. At 636, SSM 604 may flag the alternate spectrum as spectrum that may be used by AU 602 at a later time and may notify AU 602, at 637, that the alternate spectrum may have been flagged.

At 638, AU may request SSM 604 provide a list of spectrum for monitoring purposes. This may be done, for example, by sending an AVAILABLE_SPECTRUM_REQ message to SSM 604 at 638. The message may include an indication that the requested spectrum may be considered as alternate spectrum for monitoring purposes.

At 639, SSM 604 may select an alternate spectrum list and may send it to AU 602 through an AVAILABLE_SPECTRUM_RESP message. The message may include information as described herein and may include an indication that the spectrum list may be an alternate spectrum for monitoring purposes.

At 632, AU 602 may select the alternate spectrum to monitor from the spectrum list sent by SSM 604. At 642, AU 602 may notify SSM 604 of the selected alternate spectrum that may be monitored via a SPECTRUM_USE_NOTIFY message. The SPECTRUM_USE_NOTIFY message may include information indicating that the spectrum list is an alternate spectrum list. At 643, SSM 604 may flag the alternate spectrum list, for example, as being monitored by AU 602. At 648, SSM 604 may send AU 602 a SPECTRUM_USE_RESP message that may include information indicating that the referred spectrum list may be an alternate spectrum list.

If an alternate spectrum that may be monitored by AU 602 may be assigned by SSM 604 to another AU, SSM 604 may notify AU 602. For example, SSM 604 may send an AVAILABLE_SPECTRUM_RESP message or a SPECTRU- M_USE_RESP message to notify AU 602 that the alternate spectrum may have been assigned to another AU.

At 652, periodic metrics and/or reporting may be provided. For example, at 650, AU 602 may periodically report metrics to SSM 604. At 649, AU 602 may monitor the spectrum that may be in use, such as active spectrum, and may monitor alternate spectrum. The alternate spectrum to be monitored by AU 602 may be spectrum that AU 602 may use if QoA degrades. The metrics to be sent to SSM 604 may describe the RF channel and the level of occupancy of one or more spectrum segments. These metrics may assist SSM 604 to provide a ranked channel list for systems that may be operating in an area. The metrics may be used to allocate and reserve a specific spectrum segment that may meet a request for AU 602 in terms of QoA.

A message that may include metrics may be sent periodically by AU 602 to SSM 604. The message may identify a spectrum segment for which the metrics may apply The message may include an average noise level or background noise level, an interference level when the spectrum may be used by another system, or the like. The message may include a location where the measurements may be taken to derive the metrics. If the metrics were taken from multiple sources, the location where the measurement may have been taken may be included in the message. The message may include occupancy as a percentage of the time the spectrum segment may be used or occupied. For example, if another communication system such as Wi-Fi may use the spectrum segment sporadically, the metrics may relay the average occupancy. The message may include an indication of the presence of a tier 2 or tier 3 user in the area and any related identification information. For example, if a Wi-Fi system may be present and/or detected, the metrics may indicate this and may include any detectable identification. The message may include information related to the bandwidth being used by the tier 2 or tier 3 users. The message may include an indication of the presence of an incumbent in the area. For example, if a radar system may be detected, the metrics may indicate as such. The message may include information related to the radar, such as a received power level during a radar pulse, periodicity in time of the pulse bursts (e.g. due to the radar rotation speed), duration of a pulse, or the like. The message may include information related to the bandwidth being used by the incumbents. The metric message may be sent through a message type. The metric message may be sent using a SPECTRUM_USE_NOTIFY message, for example, using a metrics tag followed by the metrics.

Reporting QoA degradation may occur at 654. At 653, AU 602 may detect and may report a QoA event, such as a QoA degradation event. For example, at 656, AU 602 may to report a QoA degradation event to SSM 604.

Access to spectrum, such as QoA, may be given to a tier 2 user in exchange for monetary consideration. Users, such as public safety users, may not be incumbents, but may get access to spectrum and may receive a QoA to their assigned spectrum. AU 602 may monitor the quality of its operation on the assigned and active channels. If the QoO over the assigned spectrum deteriorates, AU 602 may verify that the assignment to the channel may be maintained.

For example, AU 602 may be an AP or an eNB and may receive access to a segment of spectrum in time and/or in frequency and may operate on that segment for an amount of time. Based on the access and an expected noise level, AU 602, which may be a AP or an eNB, and its associated clients may operate at a given QoO. The QoO may be measured by monitoring system or client performance. AU 602 may detect a deterioration of a QoO. This may be detected by measuring, for example, an increase in the occupancy of the medium while the traffic delivered may not have increased. AU 602 may detect a deterioration of the QoO by measuring an increase in frame error rate, or an increase of the moving average delay to deliver a packet, or a drop in throughput.

When a QoO of one or more clients of AU 602 deteriorates, this may trigger procedures to verify if the guaranteed QoA may still be met. The drop in QoO may be caused by factors that may not be related to the loss of exclusive access to the spectrum. For example, deterioration may be caused by one or more clients moving out of range, or by an increased demand on the system.

The AU 602 may go silent or may silence one or more of its clients to monitor the level of the interference. This may be done, for example, periodically, sporadically, or when a QoO of one or more clients of an AU deteriorates. The interference level may be compared with the level of noise floor or interference level that may have been expected when the spectrum was initially assigned. For example, SSM 604 may inform AU 602 of an expected noise level or interference for a spectrum segment assigned to a tier 2 level. As another example, AU 602 may estimate the average noise level for the spectrum segment prior to the assignment.

AU 602 may monitor the traffic that may be carried over the spectrum segment and may discover that the spectrum may be used by a Wi-Fi system that may have a different SSID, a LTE system that may have a different cellID, or the like. This may occur, for example, when a QoO of one or more clients of AU 602 may deteriorate.

AU 602 may detect the presence or the arrival of an incumbent which may not be expected based on the information sent by SSM 604. This may be performed, for example, when a QoO of one or more clients of the AU 602 may deteriorate. The incumbent may be, for example, a shipborne radar that may be approaching AU 602 and may impact communication in the reserved spectrum.

At 656, AU 602 may send a QoA event message to SSM 604. This may be done, for example, when AU 602 may detect that a QoO of one or more clients may have deteriorated. For example, AU 602 may send a QoA event message to SSM 604 when a noise level may have increased, an unexpected Wi-Fi system may be detected in the spectrum, an unexpected incumbent is detected, or the like. The QoA event message may include information related to the QoA event such as the spectrum segment, noise level, incumbent type (e.g. radar), communication type, communication id, performance metrics, the requested QoA for the spectrum assignment, performance metrics, or the like. The QoA event message may include information regarding the QoA condition detected, such as the noise level increase, an unexpected incumbent, an unexpected communication system, or the like. The QoA event message may include an indication that the cause of the interference is unknown when AU 602 may not be able to determine the cause of the interference. The QoA event message may include a spectrum request that may inform SSM 604 that a spectrum segment may be requested to satisfy the QoA request of AU 602. The spectrum request may include a suggested range of spectrum that may be used for a spectrum assignment.

The QoA event message may be an extension to the AVAILABLE_SPECTRUM_REQ message. For example, at 658, a QoA tag may be inserted in the AVAILABLE_SPECTRUM_REQ message followed by QoA event information such as metrics, cause, or the like. The QoA event message may be an extension to the SPECTRUM_USE_NOTIFY message. For example, A QoA tag may be inserted in the SPECTRUM_USE_NOTIFY message followed by QoA event information such as metrics, cause, or the like.

SSM 604 may receive a QoA event from AU 602. The QoA event may request a spectrum reallocation. At 658, AU 602 may request spectrum by sending an AVAILABLE_SPECTRUM_REQ message to SSM 604. The message may include information such as, a request to reserve the spectrum for the AU at the SSM side, a QoA request, a frequency range (e.g. ranges in 3.5 GHz or in TVWS bands), or the like. The frequency ranges, in the reallocation request may be restricted to the list of alternate spectrum that may be monitored by AU 602. For example, at 658 the AVAILABLE_SPECTRUM_REQ message my request spectrum from alternate spectrum that may be from tier 2 of the shared spectrum and may meet a QoA. The QoA may be the QoA that may have been requested at 618.

At 657, spectrum reallocation may occur. SSM 604 may assign a spectrum segment to the AU with the same level of QoA, where the spectrum segment may be selected from a set of the available spectrum that may exclude the problematic spectrum segment reported by the QoA event. At 660, a AVAILABLE_SPECTRUM_RESP message may be sent to AU 602. The AVAILABLE_SPECTRUM_RESP message may include a type=tier 2 flag and a list of possible tier 2 spectrum segments that may meet the previously requested QoA associated with the spectrum segment for which the QoA event may have occurred.

SSM 604 may not be able to fulfill the requested QoA for the requested range. SSM 604 may send an AVAILABLE_SPECTRUM_RESP message with a reject tag. AU 602 may send an AVAILABLE_SPECTRUM_REQ message in response that may include a wider frequency range or a lower QoA (e.g. smaller channel bandwidth). This may be done, for example, until SSM 604 may meet the request. SSM 604 may select a spectrum list and may transmit it to AU 602 using an AVAILABLE_SPECTRUM_RESP message.

At 662, AU 602 may determine that the spectrum list may or may not be empty. If the spectrum list may be empty, the AU may reduce the requested QoA, may change the size of the requested spectrum, may change the requested frequency range, and may resend an AVAILABLE_SPECTRUM_REQ message to SSM 604.

If AU 602 may determine that the spectrum list may not be empty, AU 602 may select the spectrum to use from the spectrum list sent from SSM 604. If the spectrum in the spectrum list is larger than the requested spectrum, AU 602 may select the requested spectrum from the spectrum list.

At 664, AU 602 may notify SSM 604 of the spectrum that may be used by AU 602 via a message, such as the SPECTRUM_USE_NOTIFY message. The SPECTRUM_USE_NOTIFY message may request SSM 604 reserve spectrum for AU 602. The SPECTRUM_USE_NOTIFY message may include information released spectrum that AU 602 may no longer use.

At 666, SSM 604 may reserve the spectrum for AU 602 and may release spectrum that may have been previously reserved for AU 602. At 668, SSM 604 may a SPECTRUM_USE_RESP message to AU 602 that may confirm the reservation of spectrum and may confirm the release of spectrum that may have been previously reserved for AU 602. At 670, AU 602 may monitor the spectrum that may be in use, such as active spectrum, and may monitor alternate spectrum.

Figure 7:
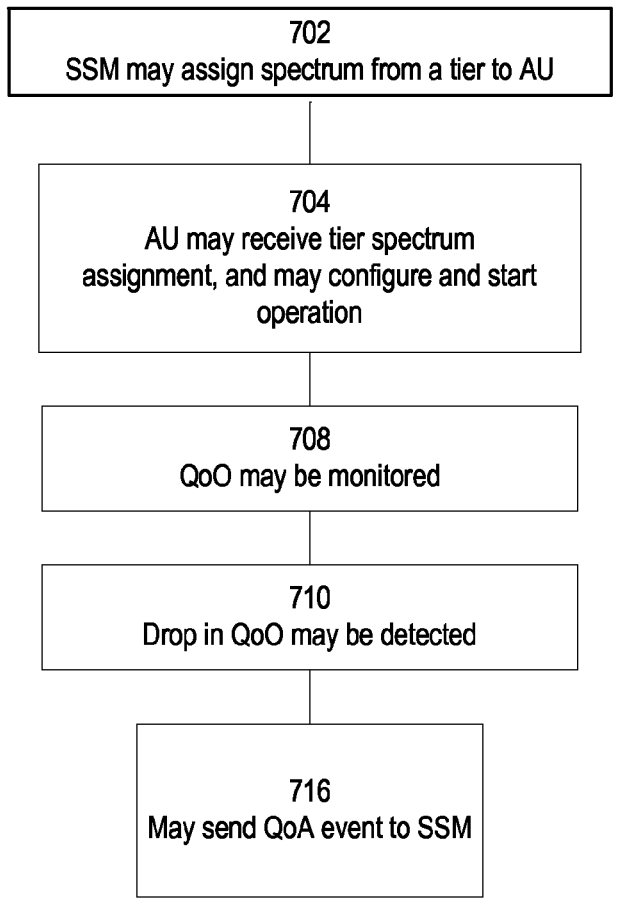
FIG. 7 depicts example logic for handling a QoA event.

FIG. 7 depicts example logic for handling a quality of access (QoA) event. At 702, a SSM may assign spectrum from a tier of shared spectrum to an AU in response to a request from the AU for spectrum that may conform to a QoA. The SSM may send spectrum list to the AU. The spectrum list may include spectrum that may be assigned to and/or used by the AU. The spectrum list may include a type of spectrum access for one or more spectrum in the list, may include a QoA for one or more spectrum in the list, or the like. At 704, the AU may receive tier spectrum assignment, may configure, and may operate on the tier spectrum assignment.

At 708, the AU may monitor QoO. For example the AU may monitor the QoO for the assigned spectrum from the tier of shared spectrum. The QoO may be measured by monitoring system or client performance. The AU may monitor the QoO for spectrum that may be in use, such as active spectrum, and may monitor alternate spectrum. The alternate spectrum to be monitored by the AU may be spectrum that the AU may use if QoA degrades. The metrics that may be sent to the SSM may describe the RF channel and the level of occupancy of one or more spectrum segments. These metrics may assist SSM to provide a ranked channel list for systems that may be operating in an area. The metrics may be used to allocate and reserve a specific spectrum segment that may meet a request for the AU in terms of QoA.

At 710, a drop in QoO may be detected. For example, the AU may detect that QoO for the assigned spectrum from the tier of shared spectrum may have degraded. This may be detected by measuring, for example, an increase in the occupancy of the medium while the traffic delivered may not have increased. The AU may detect a deterioration of the QoO by measuring an increase in frame error rate, or an increase of the moving average delay to deliver a packet, or a drop in throughput.

When a QoO of one or more clients of the AU deteriorates, this may trigger procedures to verify if the guaranteed QoA may still be met. The drop in QoO may be caused by factors that may not be related to the loss of exclusive access to the spectrum. For example, deterioration may be caused by one or more clients moving out of range, or by an increased demand on the system.

The AU may go silent or may silence one or more of its clients to monitor the level of the interference. This may be done, for example, periodically, sporadically, or when a QoO of one or more clients of the AU deteriorates. The interference level may be compared with the level of noise floor or interference level that may have been expected when the spectrum was initially assigned. For example, the SSM may inform the AU of an expected noise level or interference for a spectrum segment assigned to a tier 2 level. As another example, the AU may estimate the average noise level for the spectrum segment prior to the assignment.

At 716, the AU may send a QoA event message to the SSM. This may be done, for example, when the AU may detect that a QoO may have deteriorated. The QoA event message may include information related to the QoA event such as the spectrum segment, noise level, incumbent type (e.g. radar), communication type, communication id, performance metrics, the requested QoA for the spectrum assignment, performance metrics, or the like. The QoA event message may include information regarding the QoA condition detected, such as the noise level increase, an unexpected incumbent, an unexpected communication system, or the like. The QoA event message may include an indication that the cause of the interference is unknown when AU 602 may not be able to determine the cause of the interference. The QoA event message may include a spectrum request that may inform the SSM that a spectrum segment may be requested to satisfy the QoA request of AU. The spectrum request may include a suggested range of spectrum that may be used for a spectrum assignment.

The QoA event message may be an extension to the AVAILABLE_SPECTRUM_REQ message. For example, a QoA tag may be inserted in the AVAILABLE_SPECTRUM_REQ message followed by QoA event information such as metrics, cause, or the like. The QoA event message may be an extension to the SPECTRUM_USE_NOTIFY message. For example, A QoA tag may be inserted in the SPECTRUM_USE_NOTIFY message followed by QoA event information such as metrics, cause, or the like.

The SSM may receive a QoA event, which may be sent as a message, such as a SPECTRUM_USE_Notify message. The SSM may assign a spectrum segment to the AU with the same level of QoA where the spectrum segment may be selected from a set of the available spectrum that may exclude the problematic spectrum segment reported by the QoA event. This may be done, for example, by sending a AVAILABLE_SPECTRUM_RESP message with a type=tier 2 flag and a list of possible tier 2 spectrum segments that may meet the previously requested QoA associated with the spectrum segment for which the QoA event may have occurred.

The SSM may tag the spectrum as unusable by the AU for a given time, and may wait for the AU to make a spectrum request before reassigning a spectrum segment. The QoA event report may be used for billing purposes, such as refunding a tier 2 user.

The spectrum request message, such as an AVAILABLE_SPECTRUM_REQ message, may include the cause of the request. For example, the cause of the request may be a reconfiguration, which may be a request to replace an existing spectrum. The message may include a reason why the reconfiguration may have been requested. For example, the reconfiguration may have been requested because the system may not be able to communicate or may have poor communication. Another cause may be a QoA degradation, which may be where system may be operating below the agreed minimum QoA level. Another cause may be an optimization, which may be where a system may request a better spectrum replacement. Optimization may be requested even if the AU system may be operating above the guaranteed QoA.

The spectrum request message may include time constraint information that may be used to inform the SSM on how fast or long the SSM may have to respond to the AU. The time constraint may differ according to the reason for a reconfiguration request. For example, a short time period may be requested for lack of service, a medium time period may be requested for QoA degradation, and a long time period may be requested for an optimization. For lack of service and optimization, the spectrum request message may include an origin of the cause, such as a noise level increase, an unexpected incumbent, an unexpected communication system, an unknown cause, or the like. For a reconfiguration, the AVAILABLE_SPECTRUM_REQ message may include the spectrum identification to replace.

If the cause of interference may not have been reported, the SSM may use information collected from a third party, such as another AU that may be impacted near or at the location, a database serving that location, or the like to determine whether this may be a QoA event. This may be reported back to the AU in case of confirmation or if a QoA cause may be determined by the SSM. A cause unknown may be treated differently for billing purposes.

After the QoA event, the AU may request spectrum by sending an AVAILABLE_SPECTRUM_REQ message to a SSM. The message may include information such as, a request to reserve the spectrum for the AU at the SSM side, a QoA request, a frequency range (e.g. ranges in 3.5 GHz or in TVWS bands), or the like. The frequency ranges, in the reallocation request may be restricted to the list of alternate spectrum that may be monitored by the AU. The SSM may not be able to fulfill the requested QoA for the requested range. The SSM may send an AVAILABLE_SPECTRUM_RESP message with a reject tag. The AU may send a AVAILABLE_SPECTRUM_REQ message in response that may include a wider frequency range or a lower QoA (e.g. smaller channel bandwidth). This may be done, for example, until the SSM may meet the request. The SSM may select a spectrum list and may transmit it to the AU using an AVAILABLE_SPECTRUM_RESP message. The AU may notify the SSM regarding the spectrum that may be used by the AU through a SPECTRUM_USE_NOTIFY message. The SPECTRUM_USE_NOTIFY message may include information regarding an indication to reserve spectrum for the AU. The information may be similar to the information included in a AVAILABLE_SPECTRUM_REQ message. On receiving this message, the SSM may reserve the spectrum for the AU and may transmit to the AU a SPECTRUM_USE_RESP message that may confirm the reservation The SPECTRUM_USE_NOTIFY message may refer to a released spectrum, that may be the replaced spectrum. In this case, the message may include information such as a tag indicating that the referred spectrum in the message may be released. On receiving the message, the SSM may change the status of the spectrum from reserved to free. The SSM may reply to the AU using a SPECTRUM_USE_NOTIFY message that may indicate that the referred spectrum in the message may have been set to a free status.

Dynamic spectrum category adaptation may be provided for a shared spectrum access system. The relative BW structure for spectrum Categories B and C may dynamically adapt to an event. For example, an event may be where a secondary user (or multiple secondary users) may be experiencing congestion on bandwidth in spectrum segment B. As another example, an event may be where a primary user may begin operation on a bandwidth in spectrum segment A on which a secondary user may have been operating. The secondary user may have been operating on the bandwidth in the spectrum segment A, but may have had to quit that bandwidth and may request a bandwidth allocation.

In the case where there may not be available bandwidth to allocate to a secondary user in the spectrum segments A or B, SSM may temporarily reorganize the spectrum segments. For example, the SSM may redistribute part of the spectrum segment C to the spectrum segment B. SSM may use the added spectrum into the spectrum segment B to allocate a bandwidth to the secondary user that may ensure its guaranteed QoO.

A portion of spectrum segment B may be redistributed as spectrum segments C, where the number of guaranteed QoO users may decrease. This may occur due to the maximization of metrics (such as utilization or profit) that may be determined by the SSM. The increase in availability of spectrum in category C may result in an increase in willingness of users to utilize the available spectrum.

SSM may coordinate with users from a redistributed spectrum to vacate that spectrum. SSM system may send a message to users to evacuate the spectrum. The SSM may update its database to reflect spectrum segment redistribution.

Pricing and control mechanisms for SSM may be provided. Pricing of a shared spectrum may follow a number of guidelines. For example, a guideline may be that as shared spectrum remains less available, the pricing per QoO may increase. As another example, a guideline may be that there may be a minimum (that may be non-zero) price for SAU to get access to guaranteed QoO. That price may be based on an accepted and known monetary unit, such as US dollars, per guaranteed QoS. As another example, a guideline may be that the SSM may charge some additional usage cost for the delta between the max QoO and the guaranteed QoO. As another example, a guideline may be that in case of congestion, the agreed max QoO may be revised down for an access user as the pricing for the delta (between max QoO and guaranteed QoO) may increase. As another example, a guideline may be that the pricing per guaranteed QoO may change from one spectrum segment to another based on the demand for specific segment. This may reflect economic benefit of using bands based on natural propagation properties or coexistence complexities with PAU related to a segment. This may favor access user with broad radio flexibility to emerge. As another example, a guideline may be that the SSM may provide incentives to PAU for sharing spectrum with SAU and GAU. This may be reflected by providing a share of the revenues collected from the SAU or GAU. As another example, a guideline may be that a GAU may be charged a small cost for opportunistically using the shared spectrum based on the Max QoO it may achieve. This may assume that the guaranteed QoO may be zero.

The SSM may regulate the performance of access users through metrics to ensure that the agreed guaranteed QoO and max QoO assigned to an access user may be followed. For example, the SSM may use a reactive method to regulate performance, in which the SSM may collect from access users, periodically, statistics related to QoO. These statistics may include maximum or average delays, maximum or average throughputs, or the like. These statistics may also be monitored selectively over devices, such as cell eNBs, or over many devices and averaged. Where it may be detected that a specific user may exceeds its max QoO or that another access user may not achieve its guaranteed QoO, the SSM may account for the increase in this QoO as additional billing for that user. To compensate for this, it may move other users to a different spectrum segment so that their requested QoO may be maintained. As another example, the SSM may use a method to regulate performance in which a user may have imposed limitations (e.g. that may be verified as part of the certification of the system that may utilize the SSM services). This may prevent the system from exceeding an agreed-upon QoO. Such limitations may be implemented using, for example, restrictions to accepting the connectivity of devices, restricting or barring access to specific devices, or the like. Random checks may be performed to detect systems that may not be able to maintain their imposed limitations, and these systems may be reported to authorities and may be barred access to the SSM (if discovered).

SSA mechanisms for higher priority access user detection may be provided. Access users may have a number of different priority levels with respect to use of a spectrum segment. This priority level may be different across the spectrum segments. For example, there may be one priority for a first spectrum segment and another priority for a second spectrum segment. Depending on the policy/rules within a spectrum segment, a lower priority access user may be requested to perform some corrective action upon the arrival of a higher priority access user. A mapping of priority to access users may be provided. Access users may also be enabled to determine that a higher priority access user may have arrived and may take corrective action upon this determination.

Mapping of priority to access users may be provided. For example, a primary access user (PAU) may have the high priority within a spectrum segment and may be followed in priority by secondary access users (SAUs) and by general authorized access users (GAAUs). There may be multiple priority levels for SAUs and GAAUs. For example, SAU1 may have a higher priority that SAU2 and GAAU1 may have a higher priority than GAAU2.

Detection of the arrival of a higher priority access user may be provided. The determination of the arrival of a higher priority access user may be based upon determining that a higher priority access user may have arrived. An access user may make this determination by sensing, by some indication provided through the SSM, by some hybrid combination of sensing and SSM indication, or the like. The SSM handle many types of higher priority access users. As described herein, these higher priority access users may request different corrective actions to be performed. For example, some PAUs may request that the lower priority access users evacuate the spectrum segment. Higher priority access users may be using different radio access technologies.

A SAU and a GAAU may perform a corrective action upon arrival of the PAU active in the spectrum segment. Similarly, a GAAU may perform the corrective action upon the arrival of a SAU in a spectrum segment.

High priority access user detection may be sensing based. In cases where SAUs and GAAUs may rely on sensing for higher priority access user detection, the variety of RATs may make higher priority access user detection complex. Less capable SAUs or GAAUs may not support the RAT of the higher priority access user and may not be able to detect it. This may be resolved, for example, through a pre-emptive action whereby the segment allocation to an SAU or GAAU may take into account the ability of the SAU and GAAU to perform sensing on the technology used by the higher priority access user. For example, an SAU that may not perform detection of a WiFi signal may not be allocated a segment where a higher priority access user may use WiFi.

SAUs and GAAUs that may support multiple RATs, and may be capable of feature detection and sensing for these RAT, may waste time/power looking for higher priority access users on the wrong technologies. An SAU may not have an idea what type of higher priority access user to detect. The SSM may provide guidance to the SAUs and GAAUs with regard to the type of higher priority access user that may be sensed. For example, where an SAU may be allocated two Category A segments (S1 and S2), these segments may have an active PAU. The segment S1 may be used by a WiFi PAU and segment S2 may be used by a radar system using a RAT. The SSA system may provide RAT information to the SAU to assist in the PAU detection. For instance, it may provide the SSID and beacon period of the PAU using S1 and it may provide operating parameters for the RAT used in segment S2. The SAU may use this information to tailor its PAU sensing accordingly.

Higher priority access users may transmit a busy indication. The SAU and GAAU may be told where to find the busy indication. The busy indication may be sent so that it may be found by the SAUs and GAAUs. The indication may be sent, for example, using frequency division over a portion of the spectrum segment, may be sent using time division over the band, may be sent over some combination of time and frequency division, or the like. The SSM may signal to the SAUs and GAAUs where the busy indication may be sent. Upon receiving this information, the SAUs and GAAUs may perform sensing to try to detect this busy indication on the RAT that may carry the busy indication.

High priority access user detection may be non-sensing based. Where SAUs and GAAUs may rely on the SSM for higher priority access user detection, the SSM may be responsible for notifying the SAUs and GAAUs about the arrival of a higher priority access user. As the higher priority access users may be different, the SSM may configure different higher priority access user detection rules depending on the type of higher priority access user in a spectrum segment. These detection rules may be based on policy associated with the higher priority access user and the spectrum segment. For instance, the SAU in one spectrum segment may be asked to periodically re-contact the SSM to check for higher priority access user arrival (e.g. K seconds). An SAU in a second spectrum segment may be asked to provide and to update its contact information (e.g. IP address) so that it may be reached by the SSM in case of a higher priority access user arrival.

Hybrid based detection may be provided. An access user may rely on both sensing and the indication from the SSM to determine if it may take any corrective action. A number of hybrid based detection scenarios may be possible. For example, an access user may sense a higher priority access user and may receive an indication from the SSM. The access user may take a corrective action that may be defined by the policies/rules associated with the higher priority access user that may be operating in the spectrum segment.

As another example, an access user may not sense a higher priority access user and may not receive an indication from the SSM. The access user may continue operating on the spectrum, while continuing to sense for a higher priority access user and may monitor for an indication from the SSM.

As another example, an access user may sense a higher priority access user but may not receive an indication from the SSM. The access user may continue to follow the policies/rules associated with the sensed higher priority access user that may be operating in the spectrum segment. A number of possible actions may be taken by the access user, which may include choosing to continue operation normally, querying the SSM to determine how to proceed, modifying its operation in the spectrum segment, suspending operation for a period of time (e.g. allowing additional sensing), or the like.

As another example, an access user may not sense a higher priority access user but may receive an indication from the SSM. An access user may continue to follow the policies/rules associated with the higher priority access user that may be operating in the spectrum segment. A number of possible actions may be taken by the access user, which may include choosing to continue operation normally, querying the SSM to determine how to proceed, modifying its operation in the spectrum segment, suspending operation for a period of time (e.g. allowing additional sensing), or the like.

Corrective actions may be provided. When an access user may have determined that a higher priority access user may be present on a spectrum segment, the access user may take a corrective action, which may be determined by the policies/rules associated with the higher priority access user in the spectrum segment.

A corrective action may involve having the lower priority access user evacuate the spectrum segment. Various types of evacuation, such as those described herein, may be used. For example, a higher priority access user may request an urgent evacuation. In this case, the SSM may request to redistribute SAUs and GAAUs on the segments to be evacuated. If the access user has detected the higher priority access user, it may notify the SSM so that the SSM may perform the redistribution as described herein. There may be higher priority access users that may not request an urgent evacuation.

A corrective action may allow the access user to remain in the spectrum segment, provided that it follows some coexistence rules that may protect the higher priority access user. In such a case, the Secondary Access Users (SAUs) or General Authorized Access Users (GAAUs) may change their operating parameters or even RAT type to allow coexistence. For example, if the access user and the higher priority access user may both be CSMA based, the policy/rule may request that the lower priority access user scale up its backoff timers and interframe sensing times. This may assist the higher priority access user to access the spectrum segment. As another example, the policy/rule may request that the lower priority access user increase its transmit power, which may allow the higher priority access user to treat the lower priority access user as a strong interferer that may be cancelled using interference cancellation techniques. As another example, the SSM may provide limits as to the time and frequency on which the lower priority access user may be allowed to operate. The lower priority access user may be told when to transmit to avoid interfering with the higher priority access user.

If multiple higher priority access users may be detected, the access user may evaluate the policies/rules for the detected access users and may determine a corrective action that may satisfy higher priority access users. To ease implementation complexity, an access user may decide to evacuate a spectrum segment when more than one higher priority access user may be detected in a spectrum segment.

SSA mechanisms for inter-SSM system communication may be provided. A device or a network may be deployed in an area that may be served by two different SSMs, or may be deployed in an area where a device may interfere with networks managed by other SSMs. Such a scenario may arise, for example, in the case of an area close to the border of many countries, where a country may have decided (either through its regulatory body, or a third party spectrum management entity) to manage the spectrum in its own country independently with its own SSM. To prevent issues from arising, an SSM may periodically exchange information with neighboring SSMs. For example, the SSMs may communicate to ensure the access users (e.g. networks) managed by different SSMs may maintain their guaranteed or maximum QoO despite the presence of an access user in the vicinity. As another example, the SSMs may communicate to ensure that a primary access user that may be protected by a specific SSM may not be interfered by an access user that may be operating under the control of a neighbor SSM.

When an SSM may be provisioned, it may be aware of its neighbor SSMs and may be preconfigured with the information to communicate with that SSM. This may include, and IP address or network address to which messages may be sent to the neighbor SSM, a network port on which it may listen to messages from other SSMs, a method that may decode messages from other SSMs (different neighbors may decode messages in different ways), a frequency (how often) with which it may exchange messages with the neighbor SSMs and whether transmission of messages in an asynchronous fashion maybe possible, a geographical area managed by a SSM, or the like.

When communication link with a neighbor SSM has been established, SSMs may exchange message(s) in the form of spectrum access restrictions. Such spectrum access restrictions may serve to protect higher priority access users (such as PAUs) serviced by a first SSM from networks or devices that may operate under the control of a second SSM. This may be in the form of a band or set of bands that may not be accessed in a geographical location for and amount of time, a maximum transmit power restriction imposed on a band or set of bands, a change in out of band limitations on a band or set of bands for a certain amount of time, or the like. A restriction may then be removed when a PAU may no longer requests the channel. This restriction removal may also be transmitted to the neighbor SSM.

To assist SAUs in achieving their QoS in border areas, a SSM may determine the potential area of interference (that may jeopardize the QoO of the neighboring SSM) that may be caused by SAUs under its control. This information may be exchanged by the neighboring SSMs in the form of spectrum access indications. The spectrum access indications may include frequency bands or channels, geographical areas affected, anticipated amount of interference that may be caused to the geographical area managed by the neighbor SSM, or the like. Based on the information exchanged with the spectrum access indications, a SSM may determine whether a conflict may arise. A conflict may arise when it may be determined that interference or spectrum usage by a neighbor SSM may result in a QoO that may be lower than promised to its SAUs.

The conflict may be resolved in a number of ways. For example, if any of the SSMs have other channels available, the SAU users may be moved to the other channels. If no channels may be available, the SSMs may negotiate a buy or sell price for the spectrum in the area. This buy or sell price may be derived from the increased cost $/BW that the SSM may able to charge for the SAU(s) affected by the conflict. For example, if a first SSM may be able to make x more by maintaining the use of the border area, and a second SSM may be able to make y more by maintaining the use of the border area (where x>y), then the first SSM may pay the second SSM an amount to maintain the use of spectrum in the border area while the second SSM may force its SAUs to reduce their QoO (the payment from the second SSM may be used to offset the decrease in revenue made by the affected SAUs). The countries may have an agreement or policy that a conflict that may not be resolved by simple reallocation of channels may be resolved by splitting the bandwidth equally between the two SSMs. A sharing policy may then be enforced on the SAUs from the different SSMs until the potential conflict may be resolved (e.g. an alternate segment or channel may become available in a different frequency range).

Two SAUs may share a spectrum segment. Networks (e.g. Operating A and Operator B) may be small cell networks that may use shared spectrum and the SSM may be able to provide a certain QoO. Allocation to shared spectrum may be regulated based on a three-tier level (Primary, Secondary and Generalized Authorized Access).

For example, Operator A may see a surge in demand for a local area or may have received BW demand with high data rate that may not be fulfilled with a macro cell. Operator A may request/bid to Shared Spectrum Manager (SSM) for and amount of total shared spectrum for an area. This spectrum may be used by a set of small cells. The network capability in terms of acceptable spectrum range may also be provided. SSM may report that spectrum may be available and may allocate/reserve spectrum segments to Operator A for a given cost ($/BW) for that area. Since spectrum may not be currently used, the cost may be minimal Operator A may agree to the cost. Operator A may start using the spectrum segments and a portion of the traffic may be offloaded from the macro cell to the small cells. High data rate and quality services may be provided. Sometime later, Operator B may also make a request for an amount of shared spectrum at the same location where Operator A may already be operating. The SSM may evaluate the request, and may determine that the remaining unused shared spectrum may be insufficient to meet the bandwidth requested by Operator B. The SSM may inform both networks that the cost may have increased ($$/BW) and may ask for a demand at that cost ($$/BW).

Because of the revised cost, both networks may reduce the demand. The SSM may not inform the other party of the requested demand, which may be due to blind bidding. If both networks may not reduce their demand a number of actions may take place. For example, the database may increase cost to $$$/BW and may inform the networks of the increase which may force the networks to reduce the requested demand. As another example, the network may enforce policies such that allocated spectrum may be shared equally $$/BW. As another example, the spectrum may be split such that Operator A may request the same amount, but Operator B may reduce the demand because of the revised price. As another example, the spectrum may be split among a number of operators, such three operators, that may bid for the same spectrum resources.

The same spectrum may be shared by both networks, but the SSM may request that spectrum be shared under a ratio. The SSM may enforce policies for the BW to be shared based on the technology being used. Several ratio scenarios may be possible. For example, WiFi, LTE may be shared 50%, LTE and LTE may be shared at 50%, wireless technology may be shared at 70/30%, or the like. The SSA system may handle policies and how spectrum may be split. The SSA system may put the two systems in contact and have the two systems communicate.

Both systems may use the reduced BW and may set (revised down) internal admission control threshold that may ensure QoO. The surge in traffic may be reduced and Operator A may decide to move traffic back to the Macro. It may inform the SSM of this. SSM may inform Operator B of the cost $/BW and that the sharing policies may no longer be in effect. Operator B may increase requested BW to original demand at minimal cost ($/BW).

GAUU operation may be provided. PAU returns may be provided. For example, if PAU appears, check may be performed to determine if SAU's may be moved to another spectrum segment. If another spectrum segment may not be available that may maintain the QoO, an organization of the spectrum may be performed to take away from category C spectrum to convert to category B spectrum. If there may still be a shortage of spectrum, the cost $/BW may be increased in order to start decreasing the amount of spectrum that may be occupied and SAUs that suffer from the PAU may be moved to this created spectrum. Access to certain category A and category B spectrum by GAAU users may be temporarily disabled to make it easier on these segments to meet the QoS of the SAUs. If there may still be a shortage, the SAUs may be moved to another category A or B spectrum and some sharing policies may be imposed. The PAU may also pay a compensation to the SSM in the case it may use the spectrum unexpectedly, such as in the case of spectrum used for LSA. Such unexpected taking back of the channel may result in the SSM having to use some policies to share the channel, and the compensation paid by the PAU may be used to offset the reduction in cost.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An apparatus, the apparatus comprising:
a memory; and
a processor, the processor configured to:
send an available spectrum request that includes a performance requirement for an access user and requests a spectrum from a shared spectrum within a requested frequency band that corresponds to the performance requirement and a location for the access user;
receive an available spectrum response that includes a list of available spectrum in the shared spectrum that can be allocated for use by the access user, is within the requested frequency band, and corresponds to the location and performance requirement for the access user;
determine the spectrum to be allocated to the access user that corresponds to the performance requirement for the access user from the list of available spectrum;
send a spectrum use notification message requesting that the spectrum be allocated for use by the access user; and
receive a spectrum use response message.

2. The apparatus of claim 1, wherein the performance requirement for the access user is associated with exclusive use of the spectrum by the access user for an area, a time, a percentage of time, or a scrambling code.

3. The apparatus of claim 1, wherein the performance requirement for the access user is associated with a noise level of the spectrum that is below an acceptable level for the access user.

4. The apparatus of claim 1, wherein the available spectrum request for spectrum further requests that the spectrum be in a first tier and the list of available spectrum in the shared spectrum is in a second tier that differs from the first tier.

5. The apparatus of claim 1, wherein the processor is further configured to determine that the list of available spectrum is larger than the spectrum that was requested.

6. The apparatus of claim 1, wherein the processor is further configured to receive an allocation message indicating that the spectrum has been allocated.

7. The apparatus of claim 1, wherein the processor is further configured to determine an alternate spectrum from the list of available spectrum to be used when the spectrum can no longer conform to the performance requirement for the access user.

8. The apparatus of claim 7, wherein the processor is further configured to send a spectrum reserve message requesting that the alternate spectrum be flagged for possible use by the access user when the spectrum can no longer conform to the performance requirement for the access user.

9. The apparatus of claim 7, wherein the spectrum use notification message is a first spectrum use notification message and wherein the processor is further configured to:
determine that the spectrum can no longer conform to the performance requirement for the access user; and
send a second spectrum use notification message requesting that the alternate spectrum be allocated for use by the access user.

10. A method for requesting spectrum from a shared spectrum, the method comprising:
sending an available spectrum request that includes a performance requirement for an access user and requests a spectrum from a shared spectrum within a requested frequency band that corresponds to the performance requirement and a location for the access user;
receiving an available spectrum response that includes a list of available spectrum in the shared spectrum that can be allocated for use by the access user, is within the requested frequency band, and corresponds to the location and performance requirement for the access user;
determining the spectrum to be allocated to the access user that corresponds to the performance requirement for the access user from the list of available spectrum;
sending a spectrum use notification message requesting that the spectrum be allocated for use by the access user; and
receiving a spectrum use response message.

11. The method of claim 10, wherein the performance requirement for the access user is associated with exclusive use of the spectrum by the access user for an area, a time, a percentage of time, or a scrambling code.

12. The method of claim 10, wherein the performance requirement for the access user is associated with a noise level of the spectrum that is below an acceptable level for the access user.

13. The method of claim 10, wherein the available spectrum request for spectrum further requests that the spectrum be in a first tier and the list of available spectrum in the shared spectrum is in a second tier that differs from the first tier.

14. The method of claim 10, further comprising determining that the list of available spectrum is larger than the spectrum that was requested.

15. The method of claim 10, further comprising receiving an allocation message indicating that the spectrum has been allocated.

16. The method of claim 10, further comprising determining an alternate spectrum from the list of available spectrum to be used when the spectrum can no longer conform to the performance requirement for the access user.

17. The method of claim 16, further comprising sending a spectrum reserve message requesting that the alternate spectrum be flagged for possible use by the access user when the spectrum can no longer conform to the performance requirement for the access user.

18. The method of claim 16, wherein the spectrum use notification message is a first spectrum use notification message and wherein the method further comprises:

determining that the spectrum can no longer conform to the performance requirement for the access user; and sending a second spectrum use notification message requesting that the alternate spectrum be allocated for use by the access user.

* * * * *